(12) United States Patent
Chen

(10) Patent No.: US 12,336,597 B2
(45) Date of Patent: Jun. 24, 2025

(54) FASTENING DEVICE

(71) Applicant: Chin-Chu Chen, Taichung (TW)

(72) Inventor: Chin-Chu Chen, Taichung (TW)

(*) Notice: Subject to any disclaimer, the term of this patent is extended or adjusted under 35 U.S.C. 154(b) by 37 days.

(21) Appl. No.: 18/227,927

(22) Filed: Jul. 29, 2023

(65) Prior Publication Data

US 2024/0032654 A1 Feb. 1, 2024

(30) Foreign Application Priority Data

Aug. 1, 2022 (TW) ................................ 111128831
Jul. 7, 2023 (TW) ................................ 112125406

(51) Int. Cl.
*A43C 11/16* (2006.01)
*F16G 11/12* (2006.01)

(52) U.S. Cl.
CPC ............ *A43C 11/165* (2013.01); *F16G 11/12* (2013.01)

(58) Field of Classification Search
CPC ..... Y10T 24/2183; A43C 11/165; F16G 11/12
See application file for complete search history.

(56) References Cited

U.S. PATENT DOCUMENTS

| | | | | |
|---|---|---|---|---|
| 9,706,814 B2* | 7/2017 | Converse | ............. | A61F 5/0123 |
| 2010/0139057 A1* | 6/2010 | Soderberg | ............. | A43C 11/00 |
| | | | | 242/396.2 |
| 2015/0014463 A1* | 1/2015 | Converse | ............. | A43C 11/165 |
| | | | | 242/396.1 |
| 2015/0191326 A1* | 7/2015 | Hall | .................... | A43C 11/165 |
| | | | | 242/396.4 |
| 2017/0303643 A1* | 10/2017 | Converse | ............... | A43C 11/00 |
| 2018/0160775 A1 | 6/2018 | Pollack et al. | | |
| 2021/0289889 A1 | 9/2021 | Chen | | |

FOREIGN PATENT DOCUMENTS

| | | |
|---|---|---|
| CN | 113598482 | 11/2021 |
| KR | 101661236 | 9/2016 |

* cited by examiner

*Primary Examiner* — Jack W Lavinder
(74) *Attorney, Agent, or Firm* — CKC & Partners Co., LLC

(57) ABSTRACT

A fastening device includes a case including a plurality of engaging teeth, a spool disposed at the case and configured for a lace to be wound therearound, a knob covering the case, and an engaging unit disposed at the case and coupled to the spool. The engaging unit includes at least one pawl arm selectively coupled to at least one of the engaging teeth, and at least one abutting member. As the knob is rotated in a tensioning direction, the engaging unit is rotated and the pawl arm is disengaged from the engaging teeth to allow the spool to tension the lace. As the knob is rotated in a releasing direction to allow the pawl arm to disengage from the engaging teeth, the abutting member is deflected by a tension of the lace to offset a friction temporarily, thereby allowing the lace to be incrementally released.

13 Claims, 35 Drawing Sheets

FASTENING DEVICE

RELATED APPLICATIONS

This application claims priority to Taiwan Application Serial Number 111128831, filed Aug. 1, 2022, and Taiwan Application Serial Number 112125406, filed Jul. 7, 2023, which are herein incorporated by reference.

BACKGROUND

Technical Field

The present disclosure relates to a fastening device. More particularly, the present disclosure relates to a fastening device for releasing or tensioning a lace.

Description of Related Art

In daily life, cords, such as a lace or a thread, are usually used to tighten articles. The most common tightening method is to use the cord to reciprocately pass through holes on the article, such as eyelets of a shoe, and then tie a knot to secure the article. But in this kind of tightening method, the knot is loosened easily because of an external force. Not only does the knot need to be tied again, but also lots of inconveniences come owing to the insecurity of the articles.

In order to solve such problems, some practitioners developed a simple fastening mechanism including a case, a driving unit and a spring. The case includes holes configured for the lace to pass therethrough. Through the reaction force between the spring and the driving unit, the lace can be clamped between the driving unit and the case so as to be fastened. The length of the lace can be changed by pressing the spring to change the position of the driving unit. However, in such fastening mechanism, the restoring force of the spring is served as the securing force; thus, the lace is easily to be released owing to vibrations or an external force. In addition, the fastening mechanism has no space to receive the lace, and the exposure of the lace may bring danger.

Therefore, some practitioners developed another kind of buckle which may be rotated to tension the cord, the cord may be received inside the buckle, and through the interference between components inside the buckle, the length of the cord as well as the tightness may be adjusted. However, the structure of the buckle is complex, such that the manufacturing cost is increased, and the buckle has assembly and repair difficulties. In addition, as releasing the buckle, only full release function can be practiced, but the cord (lace) cannot be sectionally (incrementally) released, and there is still an inconvenience of usage.

Based on the aforementioned problems, how to improve the structure of the fastening device such as the buckle to include an incremental release function becomes a target that those in the industry pursue.

SUMMARY

According to one aspect of the present disclosure, a fastening device includes a case including a plurality of engaging teeth, a spool disposed at the case and configured for a lace to be wound therearound, a knob covering the case, and an engaging unit disposed at the case and coupled to the spool. The engaging unit includes at least one pawl arm selectively coupled to at least one of the engaging teeth, and at least one abutting member. As the knob is rotated in a tensioning direction, the engaging unit is rotated and the at least one pawl arm is disengaged from at least one of the engaging teeth to allow the spool to tension the lace. As the knob is rotated in a releasing direction to allow the at least one pawl arm to disengage from at least one of the engaging teeth, the at least one abutting member is deflected by a tension of the lace to offset a friction temporarily, thereby allowing the lace to be incrementally released.

According to another aspect of the present disclosure, a fastening device includes a case including a plurality of engaging teeth, a spool disposed at the case and configured for a lace to be wound therearound, a knob covering the case and including a plurality of knob teeth, and an engaging unit disposed at the case and coupled to the spool. The engaging unit includes at least one pawl arm selectively coupled to at least one of the engaging teeth. As the knob is rotated in a tensioning direction, the engaging unit is rotated to drive the spool to tension the lace, and as the knob is rotated in a releasing direction, the at least one pawl arm is incrementally and radially deflected, a tension of the lace causes the at least one pawl arm to be fully disengaged from at least one of the engaging teeth to offset a friction temporarily, thereby allowing the lace to be incrementally released.

According to yet another aspect of the present disclosure, a fastening device includes a case including a plurality of engaging teeth, a spool disposed at the case and configured for a lace to be wound therearound, a knob covering the case, at least one pawl arm selectively coupled to at least one of the engaging teeth, and at least one abutting member. As the knob is rotated in a tensioning direction, the at least one pawl arm is disengaged from at least one of the engaging teeth to allow the spool to tension the lace, and as the knob is rotated in a releasing direction to allow the at least one pawl arm to disengage from at least one of the engaging teeth, the at least one abutting member is deflected by a tension of the lace to offset a friction temporarily, thereby allowing the lace to be incrementally released.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
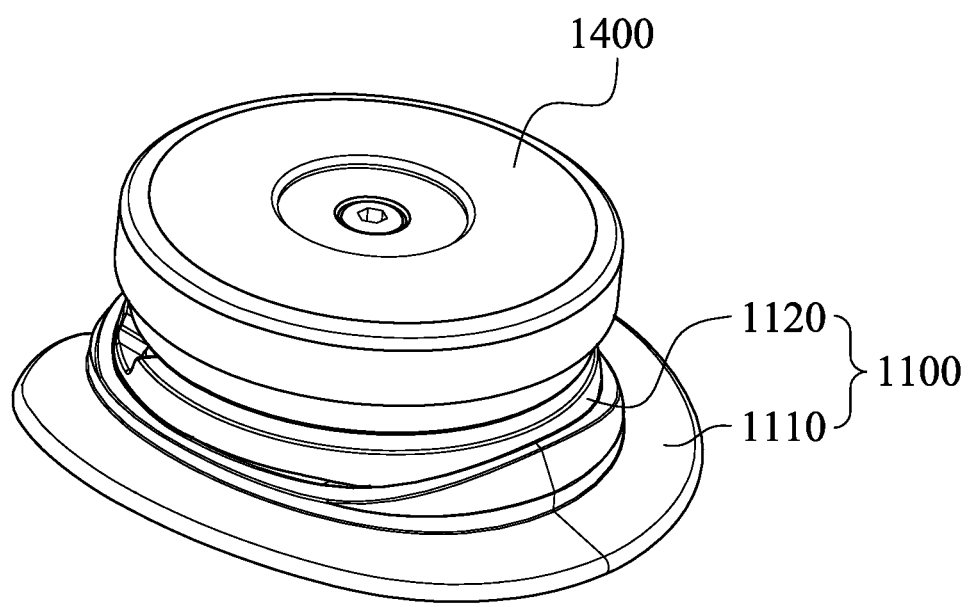
FIG. 1 is a three-dimensional schematic view of a fastening device according to a first embodiment of the present disclosure.
Figure 2:
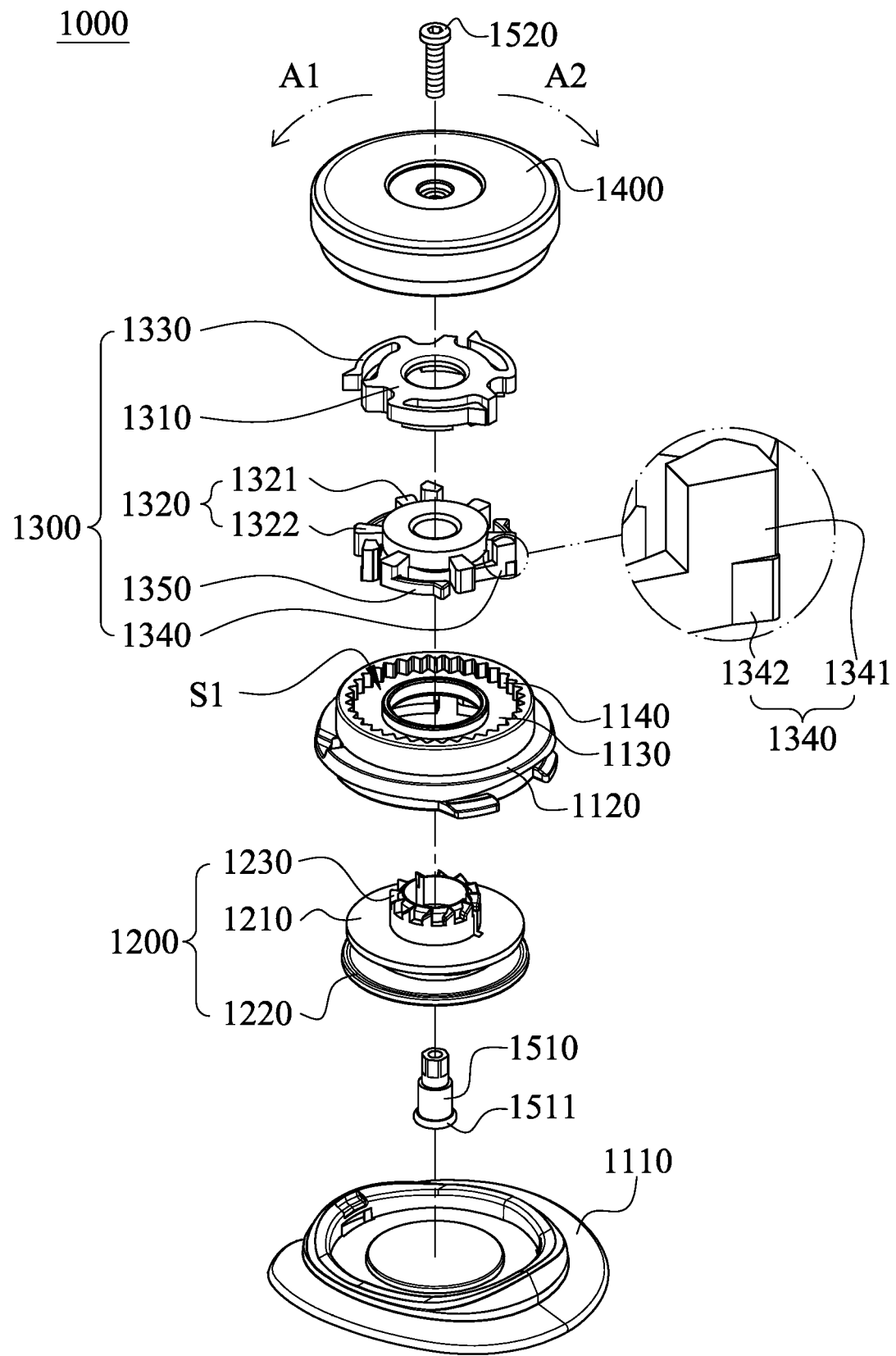
FIG. 2 is one exploded view of the fastening device of the first embodiment of FIG. 1.
Figure 3:
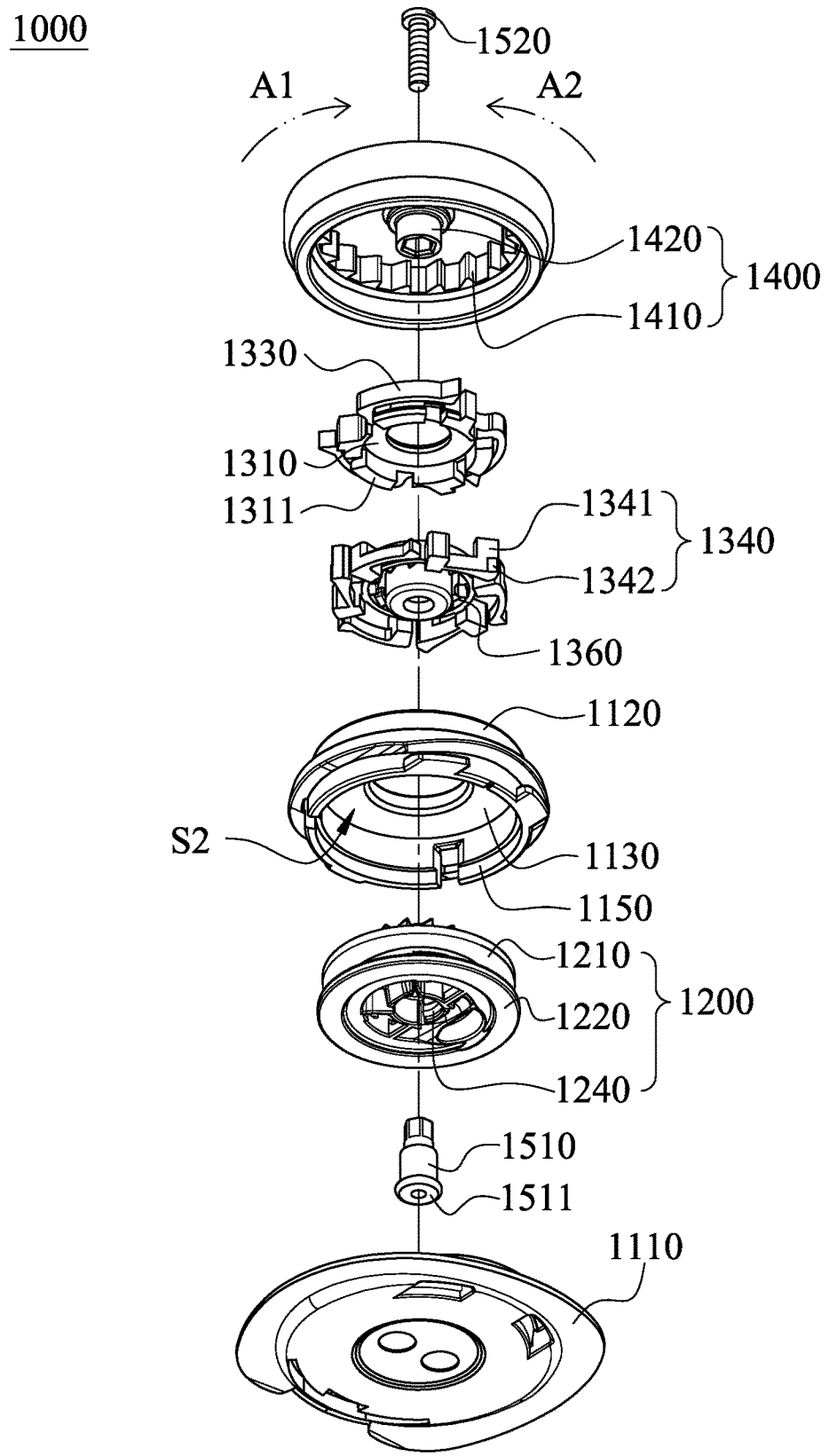
FIG. 3 is another exploded view of the fastening device of the first embodiment of FIG. 1.

FIG. 1 is a three-dimensional schematic view of a fastening device 1000 according to a first embodiment of the present disclosure. FIG. 2 is one exploded view of the fastening device 1000 of the first embodiment of FIG. 1. FIG. 3 is another exploded view of the fastening device 1000 of the first embodiment of FIG. 1. The fastening device 1000 includes a case 1100 including a plurality of engaging teeth 1140, a spool 1200 disposed at the case 1100 and configured for a lace to be wound therearound, a knob 1400 covering the case 1100, and an engaging unit 1300 disposed at the case 1100 and coupled to the spool 1200. The engaging unit 1300 includes at least one pawl arm 1340 selectively coupled to at least one of the engaging teeth 1140, and at least one abutting member 1350. As the knob 1400 is rotated in a tensioning direction A2, the engaging unit 1300 is rotated and the at least one pawl arm 1340 is disengaged from at least one of the engaging teeth 1140 to allow the spool 1200 to tension the lace. As the knob 1400 is rotated in a releasing direction A1 to allow the at least one pawl arm 1340 to disengage from at least one of the engaging teeth 1140, the at least one abutting member 1350 is deflected by a tension of the lace to offset a friction temporarily, thereby allowing the lace to be incrementally released.

Therefore, as the knob 1400 is rotated counterclockwise, the pawl arm 1340 is disengaged from the engaging teeth 1140, and since the abutting member 1350 can provide the friction, the lace will not be fully released and a tension thereof may be remained. The tension can then overcome the friction, and as the friction is overcome, the abutting member 1350 may be deflected to offset the friction temporarily, thereby releasing a small segment of the lace. The details of the fastening device 1000 will be described hereinafter.

The case 1100 may include a base 1110, a housing 1120, a partition 1130, a central hole and a lower ring groove 1150. The housing 1120 surrounds a receiving space and is detachably disposed at the base 1110. The partition 1130 extends radially and inward from the housing 1120 to separate the receiving space into an upper chamber S1 and a lower chamber S2. The central hole penetrates the partition 1130 and the upper chamber S1 is communicated with the lower chamber S2. The lower ring groove 1150 is located at the housing 1120 and is located at the lower chamber S2.

The spool 1200 includes an upper ring portion 1210, a lower ring portion 1220 and a plurality of spool teeth 1230. A winding track formed between the upper ring portion 1210 and the lower ring portion 1220 is configured for the lace to be wound therearound. The spool teeth 1230 are located at the upper ring portion 1210. The spool 1200 may be received in the lower chamber S2, the lower ring portion 1220 may be correspondingly received in the lower ring groove 1150, and the spool teeth 1230 may protrude into the upper chamber S1 via the central hole.

The engaging unit 1300 may further include an upper disc 1310, a lower disc 1320 and at least one driving arm 1330, the upper disc 1310 and the lower disc 1320 are rotatably connected, the at least one pawl arm 1340 and the at least one abutting member 1350 are located at the lower disc 1320, and the at least one driving arm 1330 is located at the upper disc 1310 and coupled to the knob 1400. To be more specific, each of the upper disc 1310 and the lower disc 1320 is a circular-disc structure, and is received in the upper chamber S1. The upper disc 1310 may include an upper disc body and three coupling portions 1311, the three coupling portions 1311 protrude downward and are arranged with intervals. The lower disc 1320 may include a lower disc body, three first radial tabs 1321 and three second radial tabs 1322. The three first radial tabs 1321 and the three second radial tabs 1322 are disposed at the lower disc body alternatively. A coupling space is formed between each of the first radial tabs 1321 and each of the second radial tabs 1322 and is configured for each of the coupling portions 1311 to couple therewith; therefore, the upper disc 1310 and the lower disc 1320 may be rotatably connected. The engaging unit 1300 may further include a driving portion 1360 located at the lower disc 1320, and the driving portion 1360 may correspondingly engage with the spool teeth 1230 extending into the upper chamber S1.

A number of the at least one pawl arm 1340 and a number of the at least one abutting member 1350 are three. Each pawl arm 1340 extends along the releasing direction A1 from each second radial tab 1322, and each abutting member 1350 extends along the releasing direction A1 from each first radial tab 1321. The pawl arm 1340 may include an engaging portion 1341 and a lower projection 1342, the lower projection 1342 protrudes integrally and extends outward from the engaging portion 1341, and the lower projection 1342 corresponds to at least one of the engaging teeth 1140. Precisely, the engaging portion 1341 of the pawl arm 1340 may include a first engaging surface 1341*a* (labeled in FIG. 4) and a second engaging surface 1341*b* (labeled in FIG. 4). The first engaging surface 1341*a* may correspond to the knob teeth 1410 and the engaging teeth 1140. The lower projection 1342 extends outward from the second engaging surface 1341*b* and corresponds to the engaging teeth 1140, and the rest portion of the second engaging surface 1341*b* may correspond to the knob teeth 1410. The abutting member 1350 may include a pawl structure and is correspondingly engaged with at least one of the engaging teeth 1140.

Figure 4:
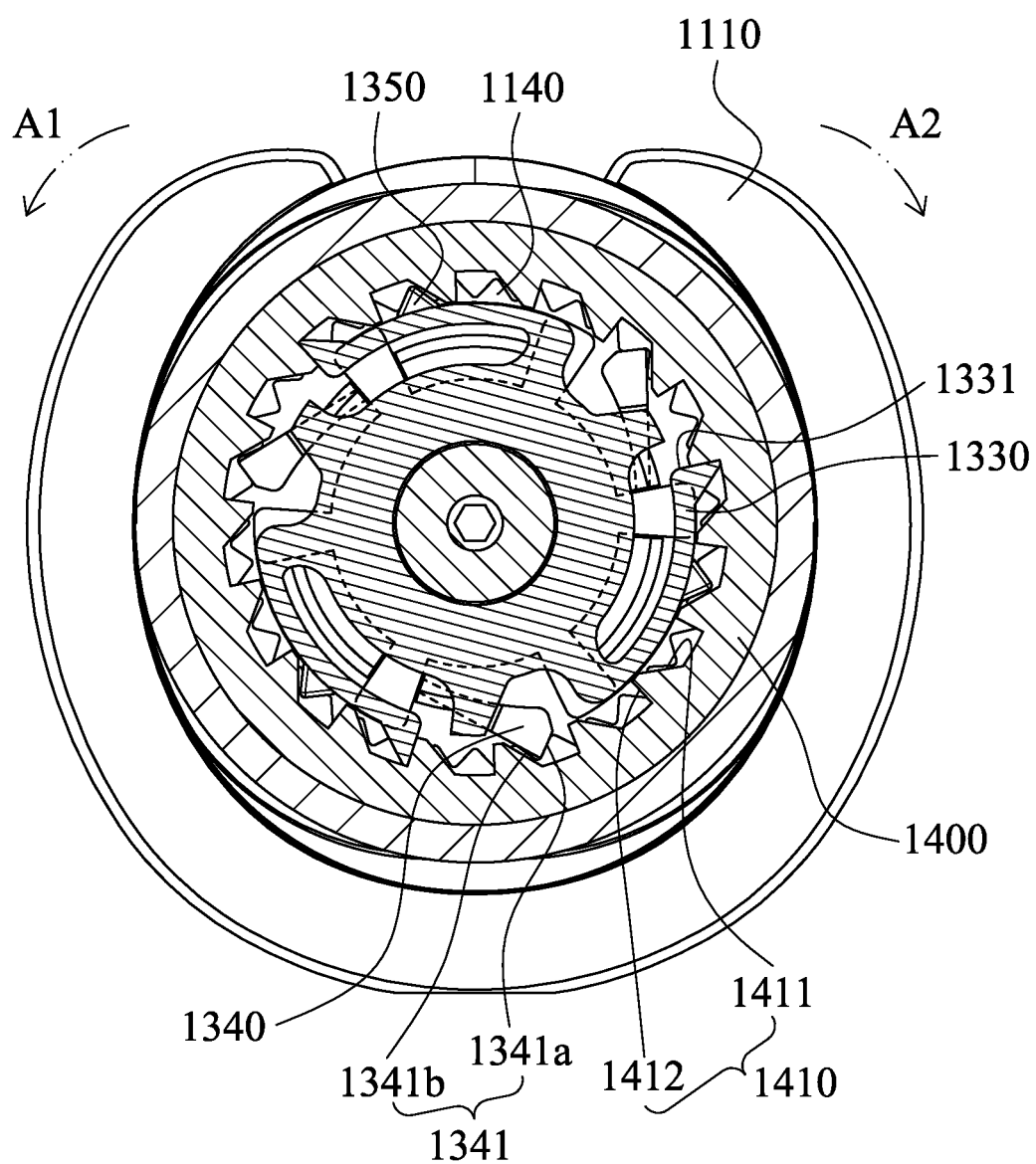
FIG. 4 is a cross-section top view of the fastening device of the first embodiment of FIG. 1.
Figure 5:
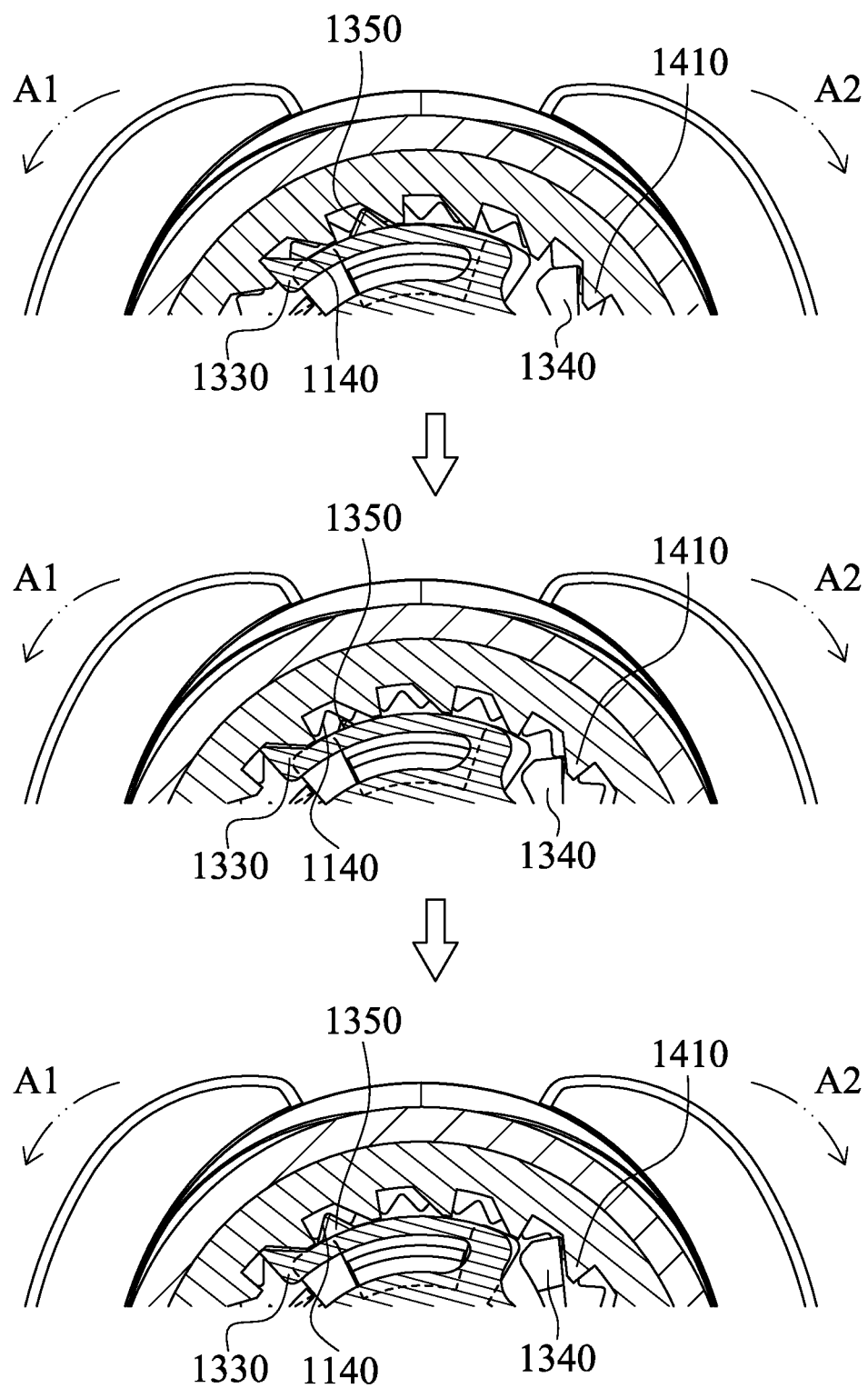
FIG. 5 is an operation shown by partial cross-section top views of the fastening device of the first embodiment of FIG. 1.

FIG. 4 is a cross-section top view of the fastening device 1000 of the first embodiment of FIG. 1. FIG. 5 is an operation shown by partial cross-section top views of the fastening device 1000 of the first embodiment of FIG. 1. The knob 1400 may include at least two knob teeth 1410, one of the at least two knob teeth 1410 corresponds to the at least one driving arm 1330, and another one of the at least two knob teeth 1410 corresponds to the pawl arm 1340. As shown in FIGS. 2 to 4, a number of the at least one driving arm 1330 is three, a number of the at least two knob teeth 1410 are plural, the knob teeth 1410 are circularly arranged around an inner side wall of the knob 1400, each of the knob teeth 1410 includes a first inclined surface 1411 and a second inclined surface 1412, a slope of each of the first inclined surfaces 1411 is different from a slope of each of the second inclined surfaces 1412, and an interval is contain between two of the knob teeth 1410 that are adjacent to each other. As the knob 1400 is rotated in the tensioning direction A2, the knob teeth 1410 push the driving arms 1330 to drive the engaging unit 1300 to rotate the spool 1200 in the tensioning direction A2, and as the knob 1400 is rotated in the releasing direction A1, the knob teeth 1410 push and allow the pawl arms 1340 to disengage from at least one of the engaging teeth 1140.

As shown in FIG. 4, each driving arm 1330 includes a pushed surface 1331, and the pushed surface 1331 corresponds to the second inclined surface 1412 of one of the knob teeth 1410. The engaging portion 1341 of each pawl arm 1340 may correspond to the interval between two adjacent knob teeth 1410 and is engaged with the engaging teeth 1140. The abutting member 1350 is also engaged with the engaging teeth 1140. At this time, if the user rotates the knob 1400 in the tensioning direction A2, the second inclined surfaces 1412 of the knob teeth 1410 push the pushed surfaces 1331 of the driving arms 1330, thereby rotating the upper disc 1310. Since the lower disc 1320 is rotatably connected to the upper disc 1310, the lower disc 1320 will be affected thereby and is rotated in the tensioning direction A2. The lower projection 1342 that is in the same side with the second engaging surface 1341*b* of the pawl arm 1340 is pushed by the engaging teeth 1140, the pawl arm 1340 is deflected inward, and the abutting member 1350 is also deflected owing to the push of the engaging teeth 1140, thereby allowing the spool 1200 to be rotated by the lower disc 1320 in the tensioning direction A2 for tensioning the lace. As the user stops forcing, the tension of the lace will pull the spool 1200 in the releasing direction A1, and because the pawl arm 1340 is engaged with the engaging teeth 1140, rotation of the spool 1200 is prohibited, and the lace is fastened.

On the contrary, if the user rotates the knob 1400 in the releasing direction A1, the first inclined surfaces 1411 of the knob teeth 1410 push the second engaging surfaces 1341*b* of the engaging portion 1341. As shown in FIG. 5, the pawl arm 1340 is incrementally disengaged from the engaging teeth 1140 while the abutting member 1350 is still engaged with the engaging teeth 1140. Because the abutting member 1350 is still engaged with the engaging teeth 1140, a friction can be provided. Consequently, the lace will not be fully released at this time, and the tension of the lace that pulls the spool 1200 in the releasing direction A1 can be remained. As the tension of the lace is larger than the friction between the abutting member 1350 and the engaging teeth 1140, the lace pulls the spool 1200 to rotate in the releasing direction A1. Since the pawl arm 1340 is separated from the engaging teeth 1140 owing to press of the knob teeth 1410, the pawl arm 1340 cannot prohibit the spool 1200 from rotating in the releasing direction A1. Hence, the spool 1200 may be rotated by the tension of the lace to rotate the upper disc 1310 and the lower disc 1320 in the releasing direction A1. Meanwhile, the pawl arm 1340 will be disengaged from the knob teeth 1410 and is engaged with the engaging teeth 1140 again, which causes the spool 1200 to stop rotating, and the abutting member 1350 can also return to the status of engaging with the engaging teeth 1140. Therefore, one segment of the lace can be released, and the goal of incremental releasing of the lace can be achieved.

Figure 6:
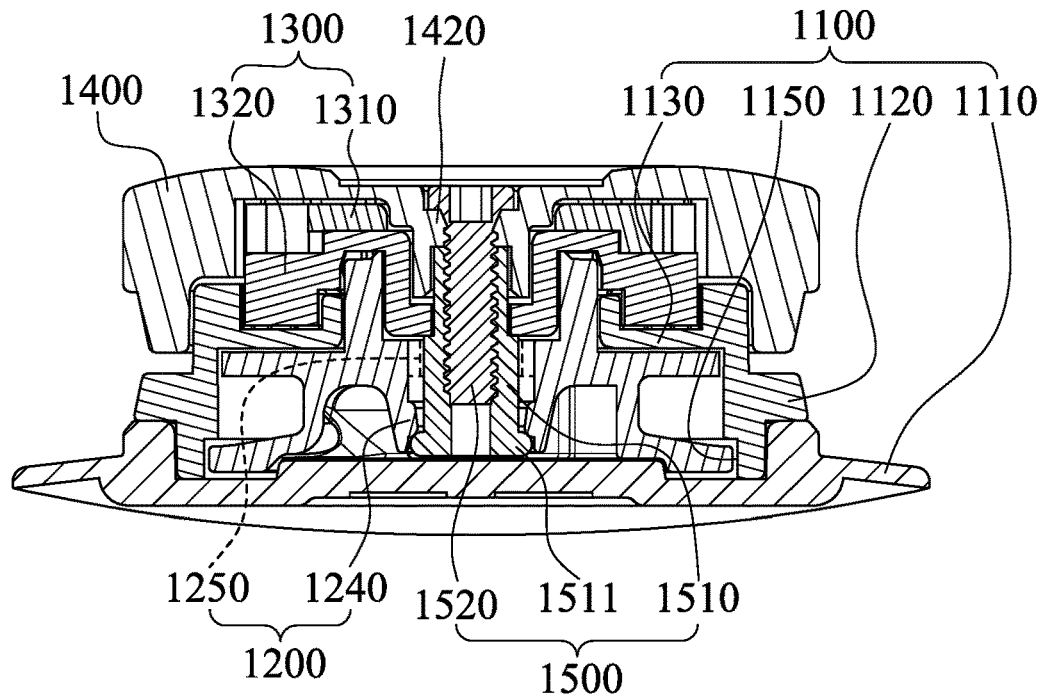
FIG. 6 is one cross-section side view of the fastening device of the first embodiment of FIG. 1.
Figure 7:
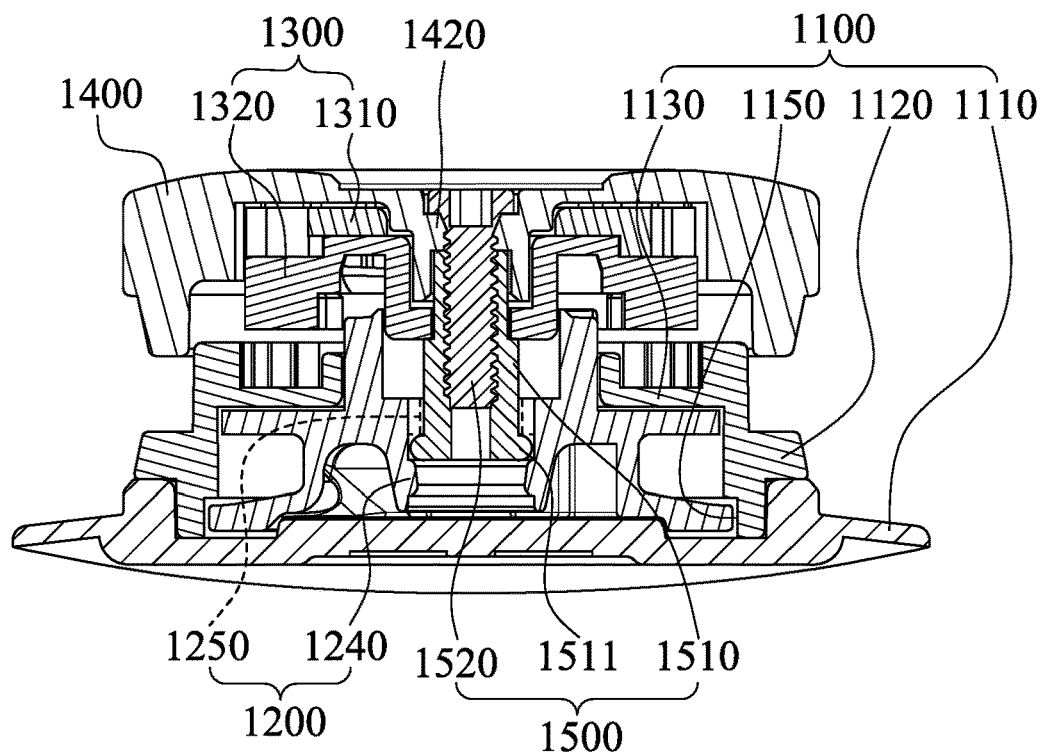
FIG. 7 is another cross-section side view of the fastening device of the first embodiment of FIG. 1.

FIG. 6 is one cross-section side view of the fastening device 1000 of the first embodiment of FIG. 1. FIG. 7 is another cross-section side view of the fastening device 1000 of the first embodiment of FIG. 1. The fastening device 1000 may include a connecting unit 1500, and the connecting unit 1500 includes a central shaft 1510 and a screw member 1520. The knob 1400 may further include a connecting boss 1420, and the spool 1200 may further include a stopping portion 1250 and a positioning portion 1240. The stopping portion 1250 extends from an inner edge of the upper ring portion 1210 toward an axial bore of the spool 1200, and the positioning portion 1240 extends downward from the stopping portion 1250. The central shaft 1510 may pass through the axial bore of the spool 1200 and pass the central hole of the case 1100 to pass through the engaging unit 1300, and then may enter the connecting boss 1420. The screw member 1520 may pass downward from the knob 1400 to insert and to screw with the central shaft 1510. Therefore, the spool 1200, the engaging unit 1300, the knob 1400 and the housing 1120 may be integrally connected. In addition, the central shaft 1510 may include a positioning protrusion 1511, and the positioning protrusion 1511 may be restricted by the positioning portion 1240.

As shown in FIG. 6, the knob 1400 is not pulled up and is in the first position, at this time the positioning protrusion 1511 is located below the positioning portion 1240, and the fastening device 1000 can be operated to tension or incrementally release the lace. On the contrary, as shown in FIG. 7, as fully releasing the lace, the knob 1400 may be pulled upward to the second position. The central shaft 1510 will move upward to allow the positioning protrusion 1511 to be located above the positioning portion 1240, and the positioning protrusion 1511 will be restricted by the stopping portion 1250 of the spool 1200 and cannot separate from the spool 1200. Since the engaging unit 1300 is abutted against a shoulder of the central shaft 1510, the engaging unit 1300 will be moved upward by the central shaft 1510. The spool teeth 1230 will be disengaged from the driving portion 1360, and free rotation of the spool 1200 will not be restricted by the engaging unit 1300, thereby fully releasing the lace.

Figure 8:
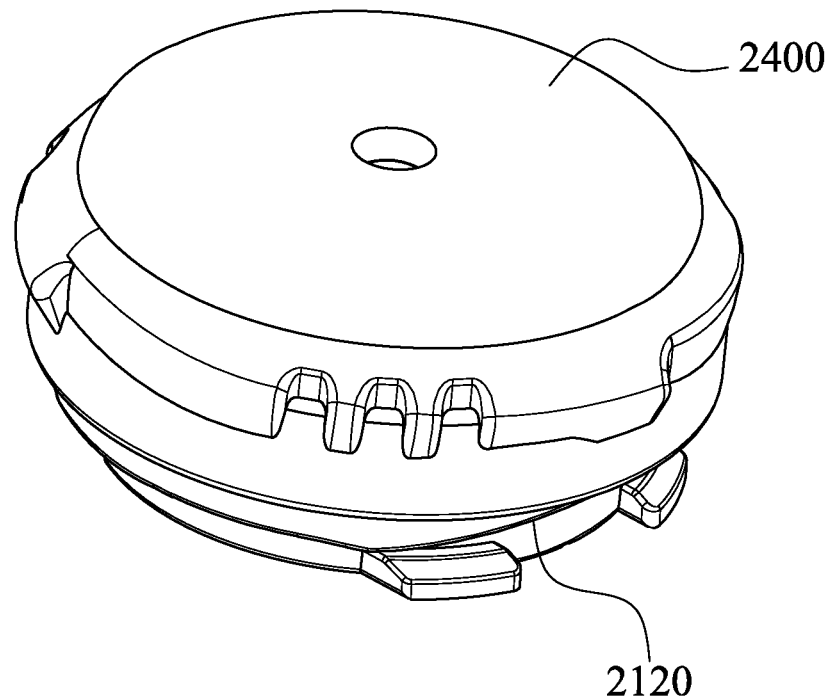
FIG. 8 is a three-dimensional schematic view of a fastening device according to a second embodiment of the present disclosure.
Figure 9:
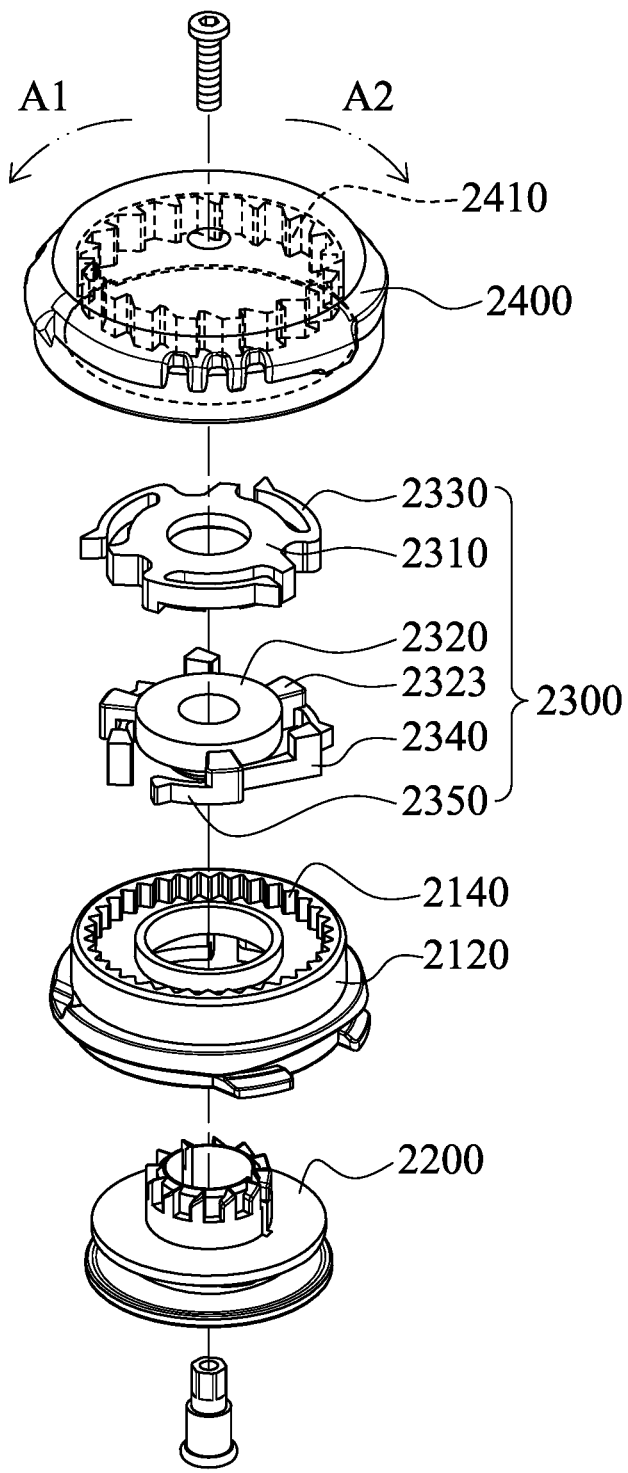
FIG. 9 is one exploded view of the fastening device of the second embodiment of FIG. 8.
Figure 10:
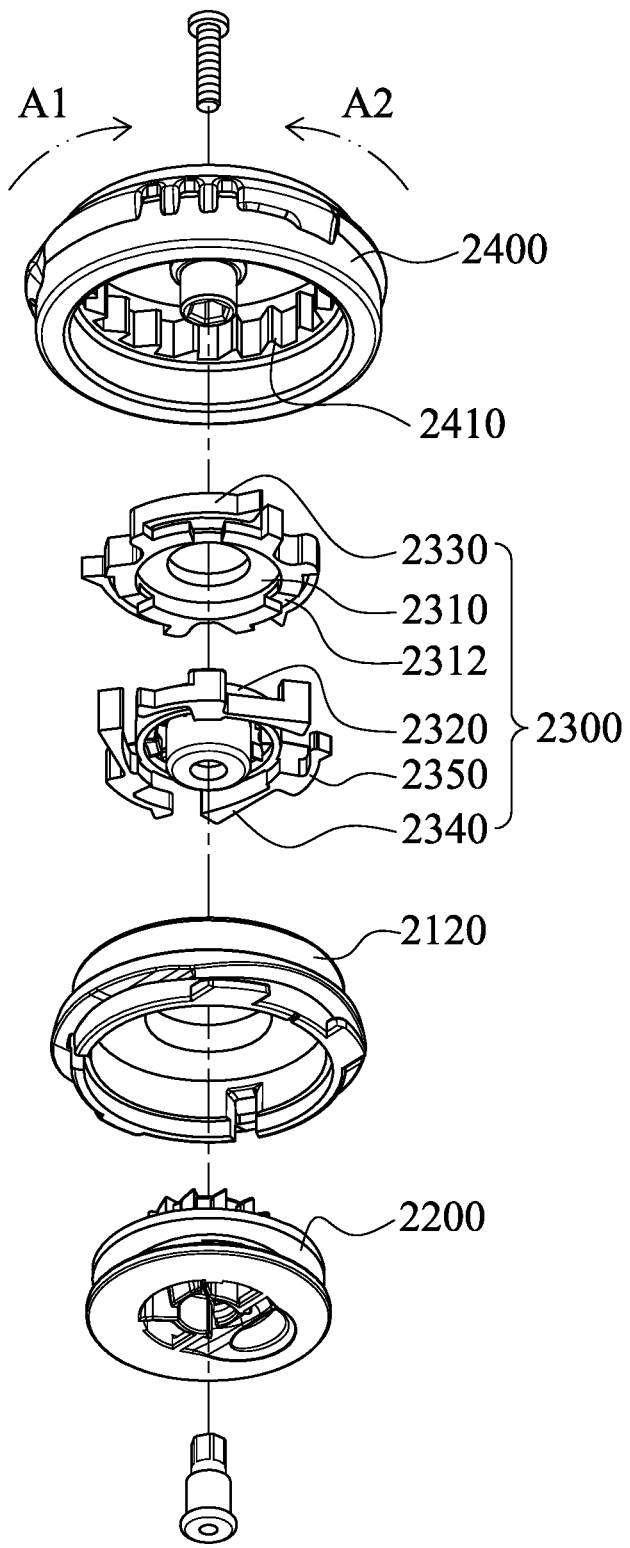
FIG. 10 is another exploded view of the fastening device of the second embodiment of FIG. 8.
Figure 11:
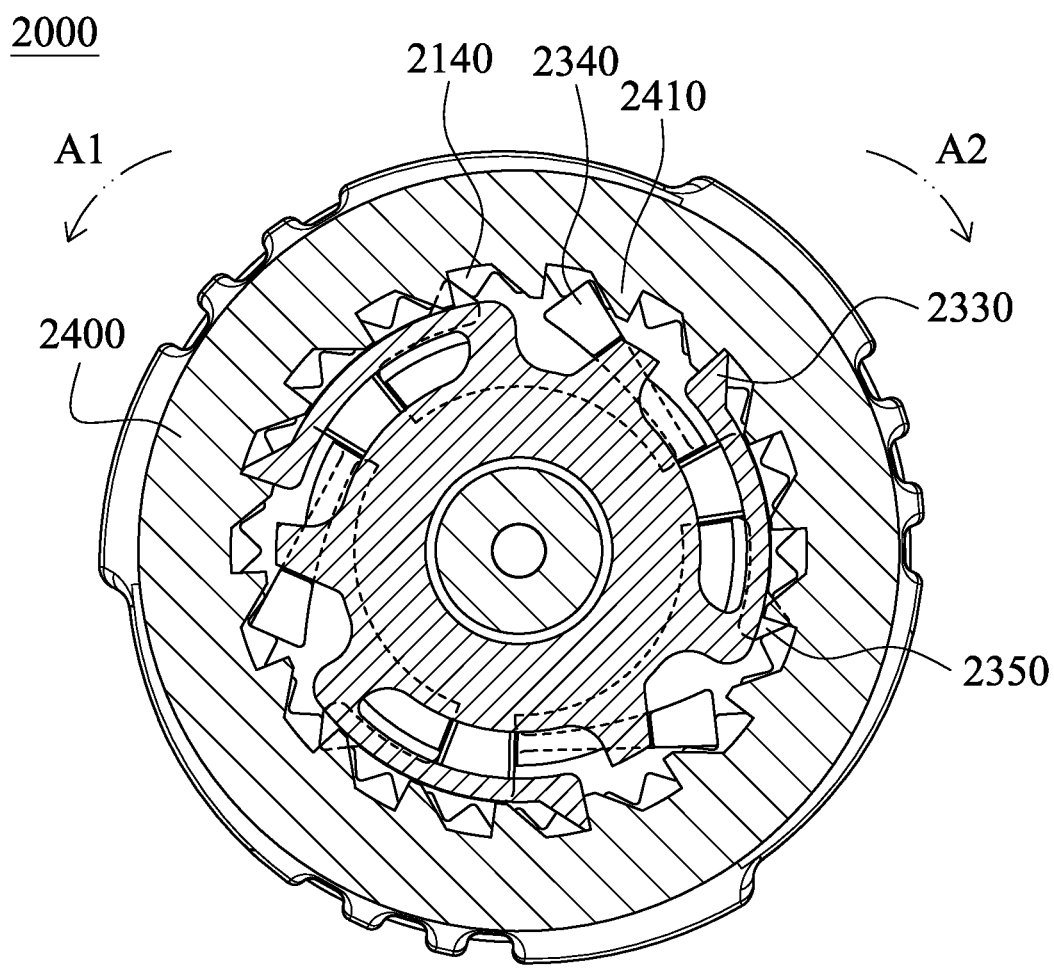
FIG. 11 is a cross-section top view of the fastening device of the second embodiment of FIG. 8.

FIG. 8 is a three-dimensional schematic view of a fastening device 2000 according to a second embodiment of the present disclosure. FIG. 9 is one exploded view of the fastening device 2000 of the second embodiment of FIG. 8. FIG. 10 is another exploded view of the fastening device 2000 of the second embodiment of FIG. 8. FIG. 11 is a cross-section top view of the fastening device 2000 of the second embodiment of FIG. 8. The fastening device 2000 of the second embodiment is similar to the fastening device 1000 of the first embodiment and includes a case (not labeled in the second embodiment), a spool 2200, an engaging unit 2300, a knob 2400 and a connecting unit (not labeled in the second embodiment). The case includes a housing 2120 and a plurality of engaging teeth 2140. The engaging unit 2300 includes an upper disc 2310, a lower disc 2320, driving arms 2330, pawl arms 2340 and abutting members 2350. The knob 2400 includes a plurality of knob teeth 2410, and only the differences thereof are mentioned hereinafter. It is noted that, in the second embodiment, the base of the case is omitted.

The knob teeth 2410 are located at an inner side wall of the knob 2400. The engaging portion of the pawl arm 2340 does not include any lower projection. The upper disc 2310 includes three engaging cavities 2312, the lower disc 2320 includes three radial tabs 2323, and each of the radial tabs 2323 is correspondingly engaged with each of the engaging cavities 2312.

Each of the pawl arms 2340 extends from one side of each radial tab 2323 toward the releasing direction A1, and each of the abutting members 2350 extends from another side of each radial tab 2323 toward the tensioning direction A2.

Figure 12:
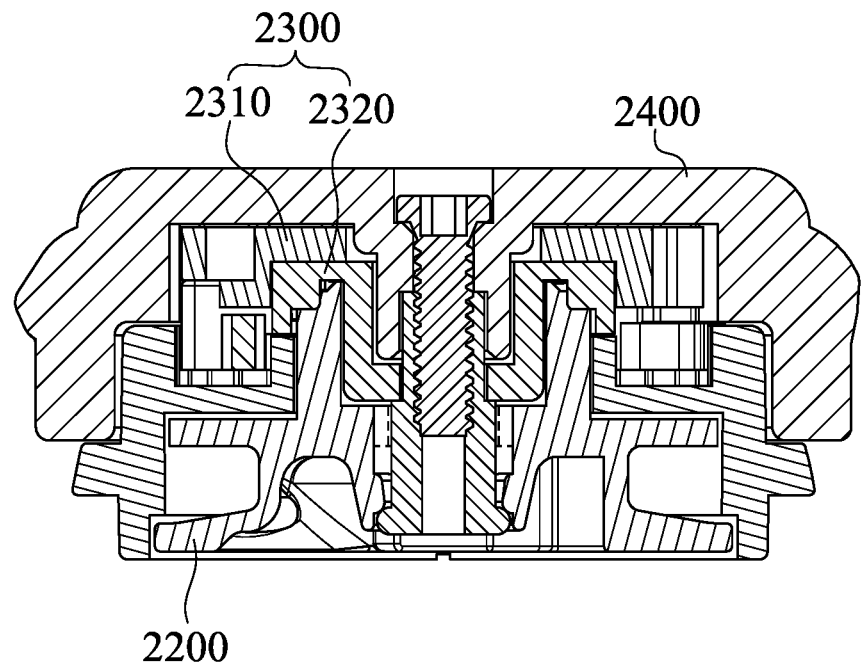
FIG. 12 is one cross-section side view of the fastening device of the second embodiment of FIG. 8.
Figure 13:
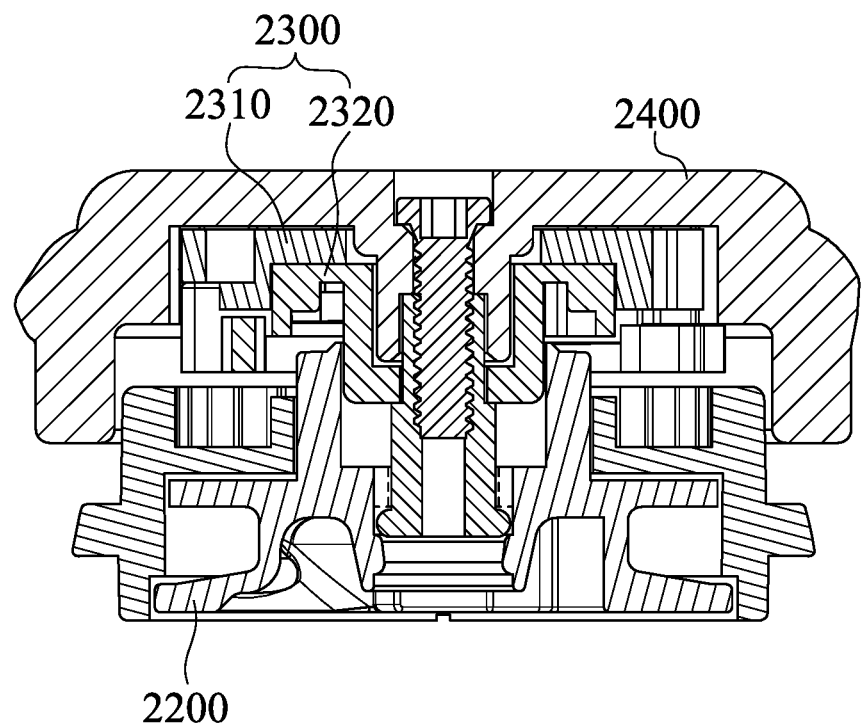
FIG. 13 is another cross-section side view of the fastening device of the second embodiment of FIG. 8.

FIG. 12 is one cross-section side view of the fastening device 2000 of the second embodiment of FIG. 8. FIG. 13 is another cross-section side view of the fastening device 2000 of the second embodiment of FIG. 8. As shown in FIG. 12, the knob 2400 is not pulled up and is in the first position, rotating the knob 2400 in the tensioning direction A2 may allow the spool 2200 to tension the lace, and rotating the knob 2400 in the releasing direction A1 may deflect the pawl arm 2340 to incrementally release the lace. On the contrary, as shown in FIG. 13, the knob 2400 may be pulled upward to the second position, and the lace may be fully released.

Figure 14:
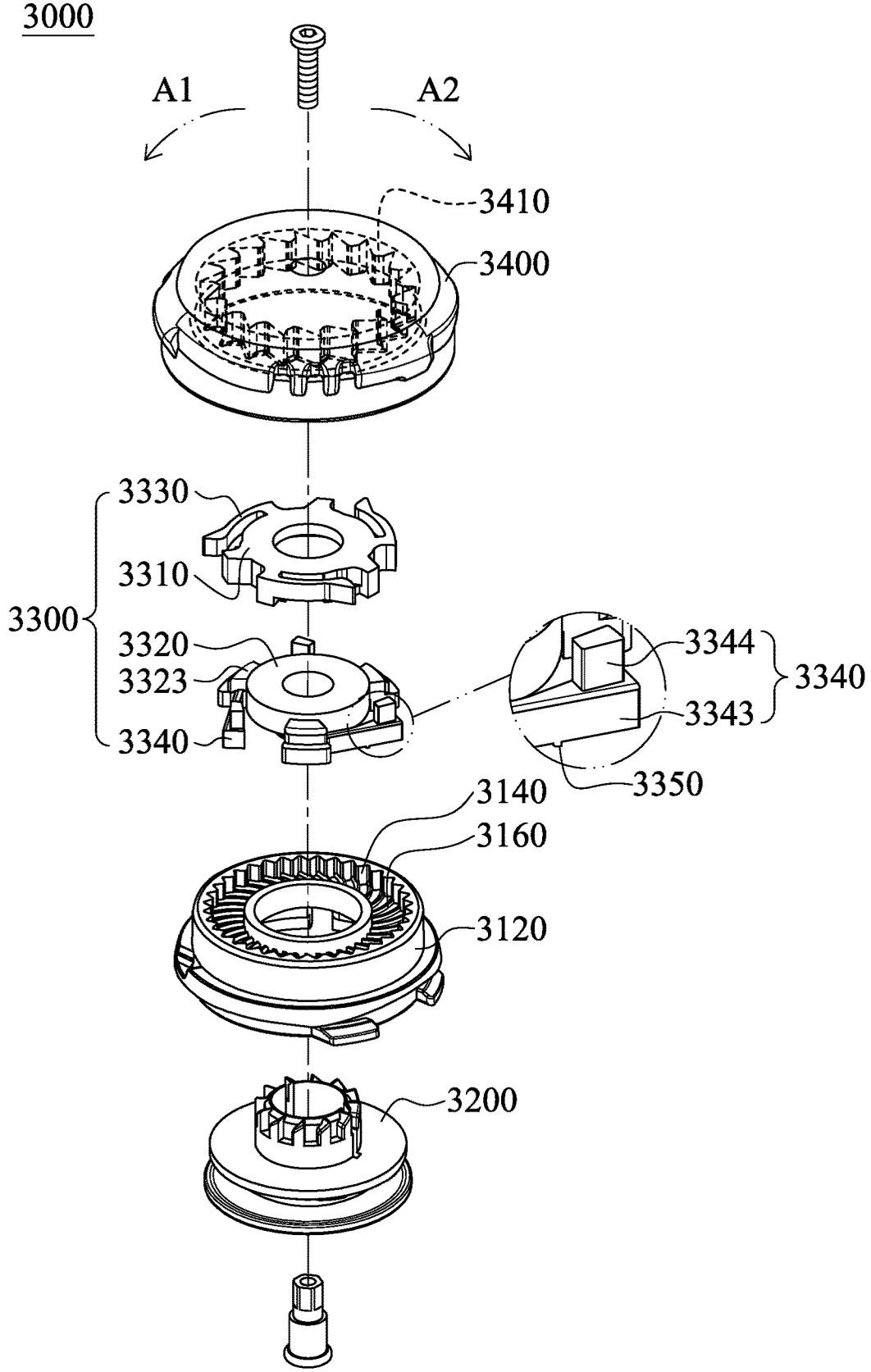
FIG. 14 is one exploded view of a fastening device according to a third embodiment of the present disclosure.
Figure 15:
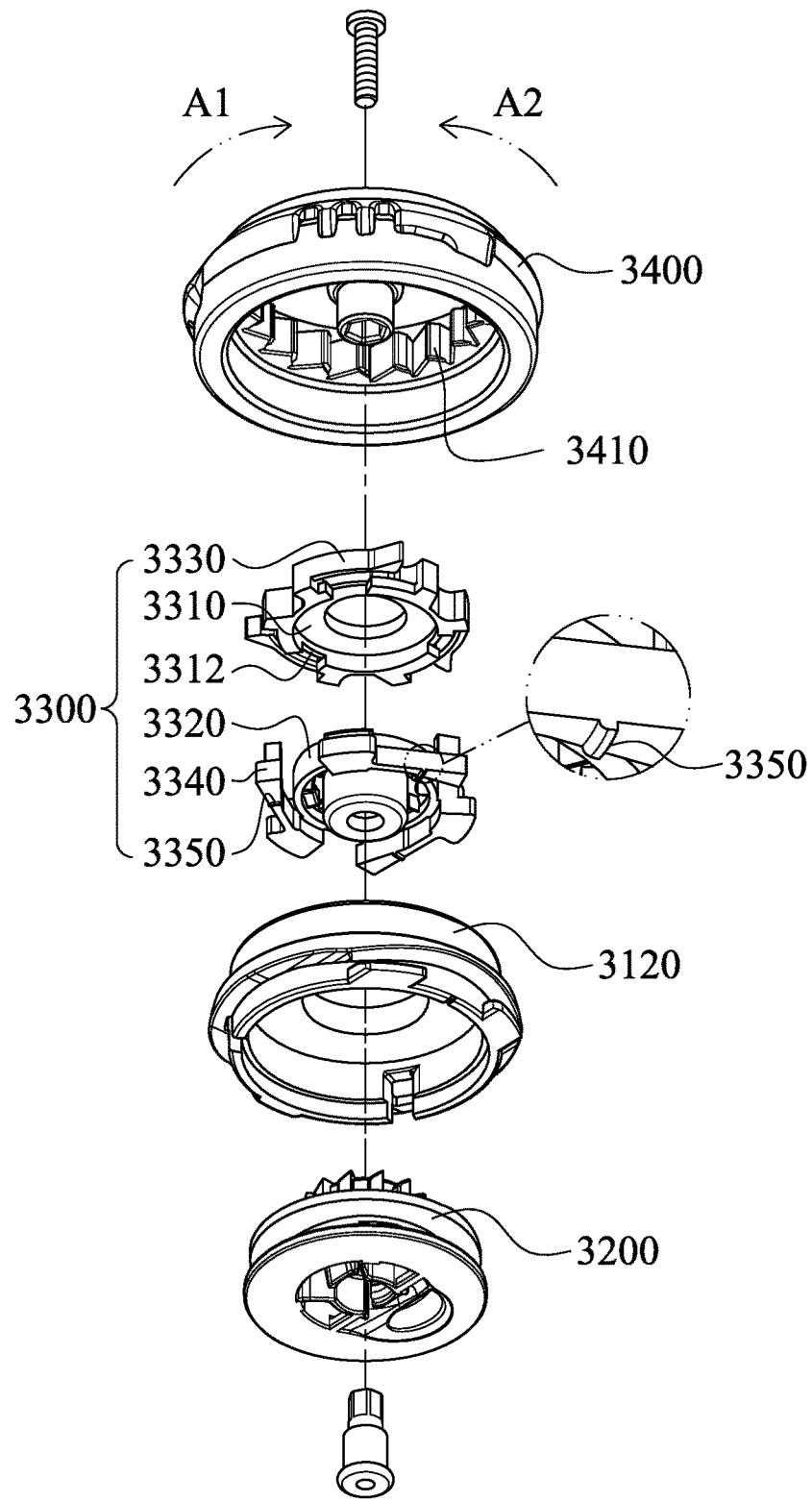
FIG. 15 is another exploded view of the fastening device of the third embodiment of FIG. 14.

FIG. 14 is one exploded view of a fastening device 3000 according to a third embodiment of the present disclosure. FIG. 15 is another exploded view of the fastening device 3000 of the third embodiment of FIG. 14. The fastening device 3000 of the third embodiment is similar to the fastening device 1000 of the first embodiment and includes a case (not labeled in the third embodiment), a spool 3200, an engaging unit 3300, a knob 3400 and a connecting unit (not labeled in the third embodiment). The case includes a housing 3120 and a plurality of engaging teeth 3140. The engaging unit 3300 includes an upper disc 3310, a lower disc 3320, driving arms 3330, pawl arms 3340 and abutting members 3350. The knob 3400 includes a plurality of knob teeth 3410, and only the differences thereof are mentioned hereinafter. It is noted that, in the third embodiment, the base of the case is omitted.

Figure 17:
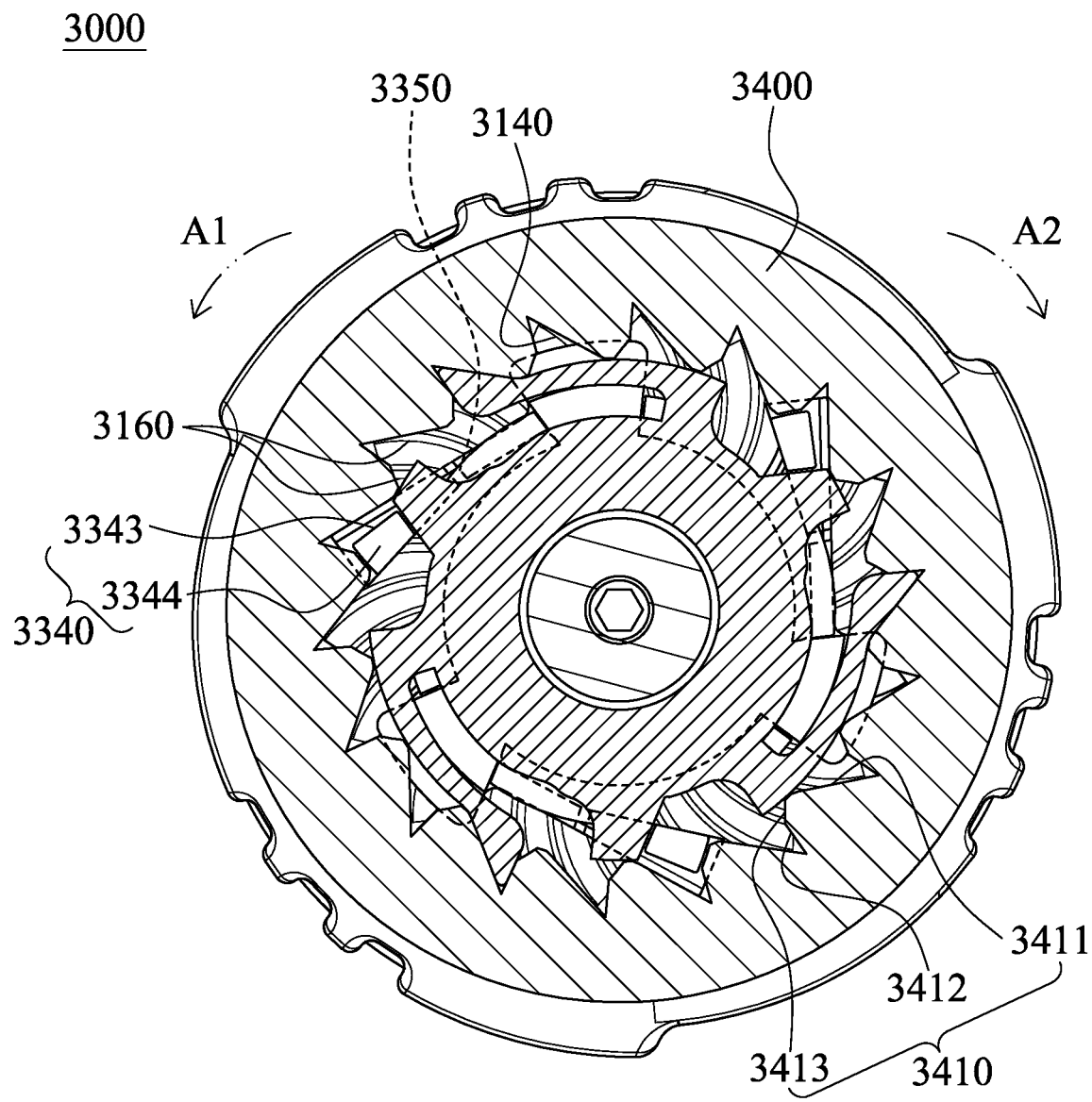
FIG. 17 is a cross-section top view of the fastening device of the third embodiment of FIG. 14.

The knob teeth 3410 are located at an inner side wall of the knob 3400, and each of the knob teeth 3410 includes a first inclined surface 3411 (labeled in FIG. 17), a second inclined surface 3412 (labeled in FIG. 17) and a third inclined surface 3413 (labeled in FIG. 17). The third inclined surface 3413 is connected between the first inclined surface 3411 and the second inclined surface 3412, and no interval is contained between each knob tooth 3410 as shown in the first embodiment.

Figure 16:
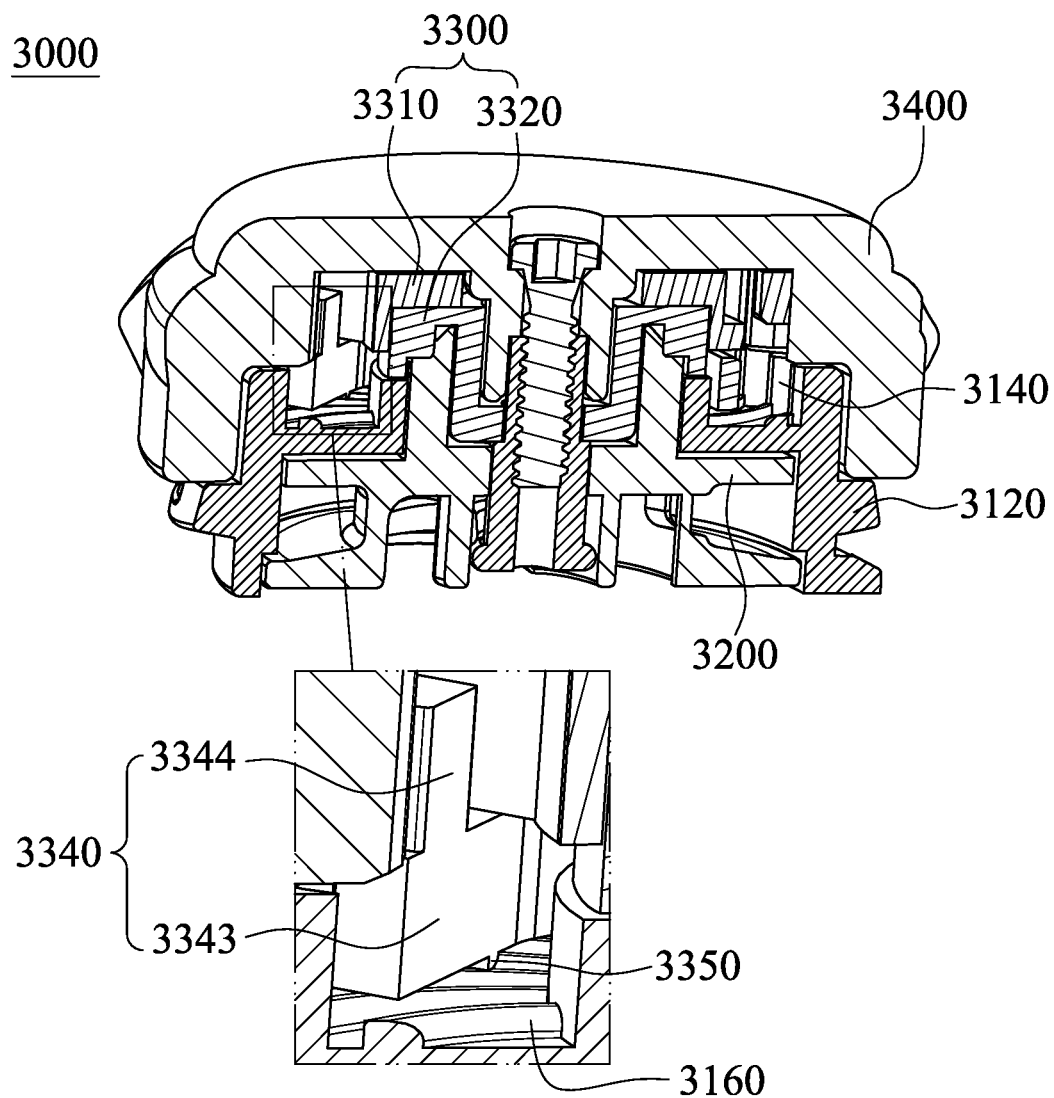
FIG. 16 is a three-dimensional cross-section view of the fastening device of the third embodiment of FIG. 14.

FIG. 16 is a three-dimensional cross-section view of the fastening device 3000 of the third embodiment of FIG. 14. FIG. 17 is a cross-section top view of the fastening device 3000 of the third embodiment of FIG. 14. Please refer to FIGS. 16 to 17 with references of FIGS. 14 to 15, the upper disc 3310 includes three engaging cavities 3312, the lower disc 3320 includes three radial tabs 3323, and each of the radial tabs 3323 is correspondingly engaged with each of the engaging cavities 3312. Each of the pawl arms 3340 may include a lower arm portion 3343 and an upper protrusion 3344, the lower arm portion 3343 extends from one side of each radial tab 3323 toward the releasing direction A1, and a distal end of the lower arm portion 3343 may be engaged with the engaging teeth 3140. The upper protrusion 3344 is located on the top of the distal end of the lower arm portion 3343 and is correspondingly engaged with the knob teeth 3410.

The abutting member 3350 may be located below the pawl arm 3340 and has a strip structure. The case may include a plurality of stopping curved ribs 3160 protruding upward from the partition (not labeled in the third embodiment) and corresponding to the abutting member 3350. The stopping curved ribs 3160 may be circularly arranged on the partition. More particularly, the extending direction of the abutting member 3350 is perpendicular to the extending direction of the lower arm portion 3343. The extending direction of the abutting member 3350 is not parallel to the stopping curved rib 3160, and the abutting member 3350 is in a gap formed between two adjacent stopping curved ribs 3160 in a general status.

Figure 18:
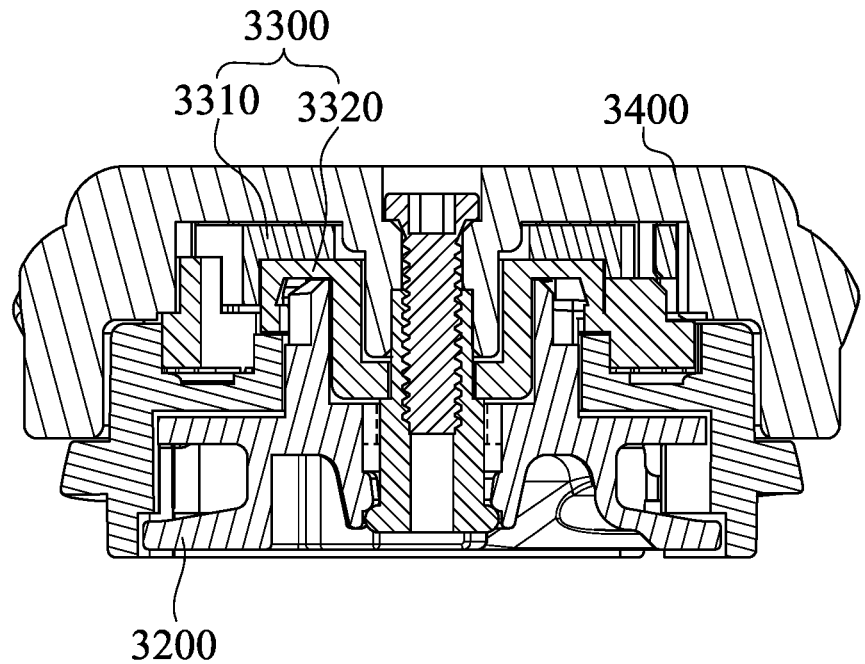
FIG. 18 is one cross-section side view of the fastening device of the third embodiment of FIG. 14.
Figure 19:
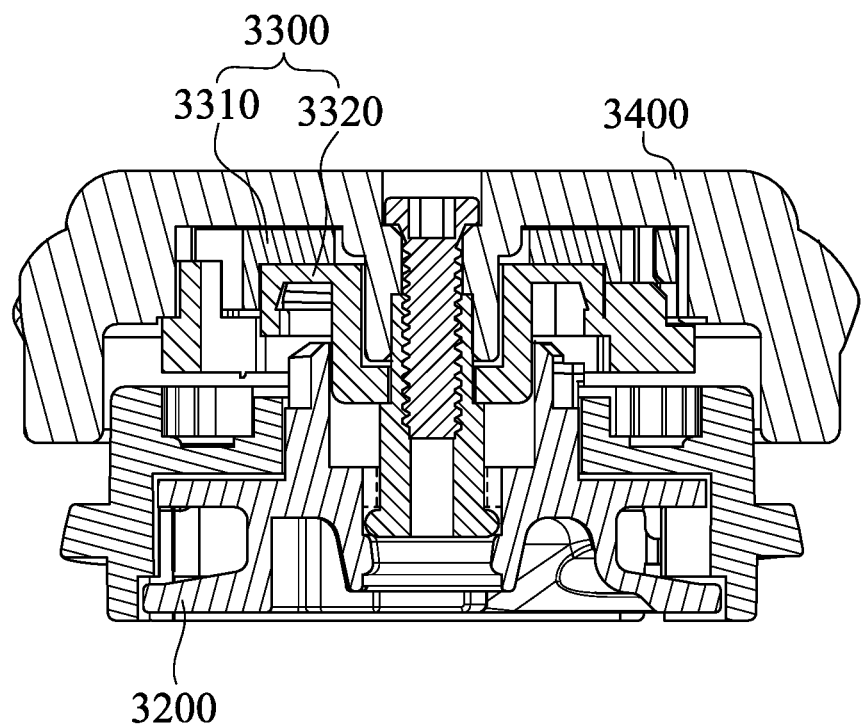
FIG. 19 is another cross-section side view of the fastening device of the third embodiment of FIG. 14.

FIG. 18 is one cross-section side view of the fastening device 3000 of the third embodiment of FIG. 14. FIG. 19 is another cross-section side view of the fastening device 3000 of the third embodiment of FIG. 14. As shown in FIG. 18, the knob 3400 is located in a first position. As the knob 3400 is rotated in the tensioning direction A2 to rotate the engaging unit 3300, the pawl arm 3340 will be disengaged from the engaging teeth 3140, and the abutting member 3350 will be disengaged from the gap between two adjacent stopping curved ribs 3160, thereby allowing the spool 3200 to tension the lace. On the contrary, as the knob 3400 is rotated in the releasing direction A1, the knob teeth 3410 deflect the upper protrusion 3344 while the abutting member 3350 is still located at the gap between two adjacent stopping curved ribs 3160, the lace will not be fully released at this time, and the tension of the lace to pull the spool 3200 in the releasing direction A1 is remained. As the tension of the lace is larger than a friction between the abutting member 3350 and the stopping curved ribs 3160, the tension of the lace pulls the spool 3200 to rotate in the releasing direction A1, the abutting member 3350 is deflected, and the spool 3200 may be rotated in the releasing direction A1. Then, the pawl arm 3340 is engaged with the engaging teeth 3140 again, which causes the spool 3200 to stop rotating, and the abutting member 3350 can also return to the gap between two adjacent stopping curved ribs 3160. Therefore, one segment of the lace can be released, and the goal of incremental releasing of the lace can be achieved. Moreover, as shown in FIG. 19, as the knob 3400 is pulled upward to be located at a second position, the lace may be fully released.

Figure 20:
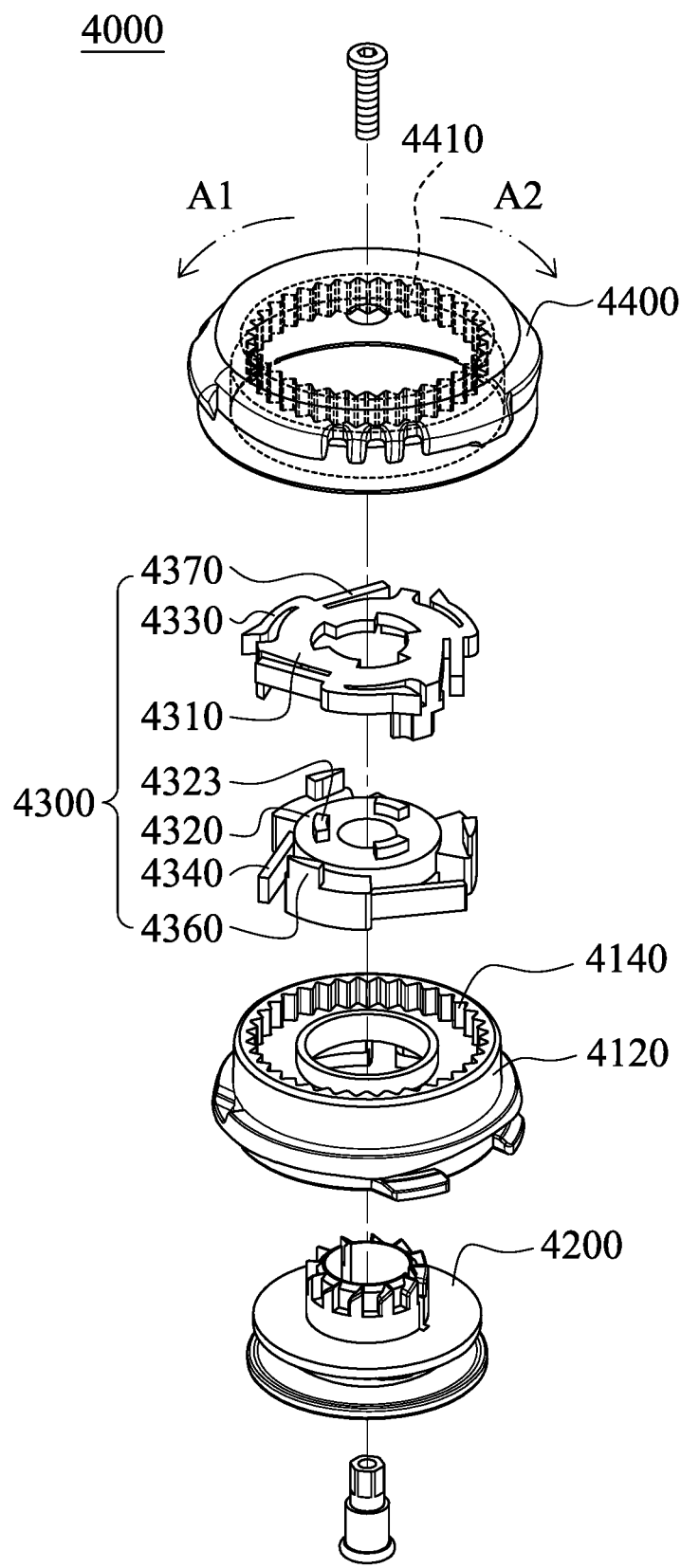
FIG. 20 is one exploded view of a fastening device according to a fourth embodiment of the present disclosure.
Figure 21:
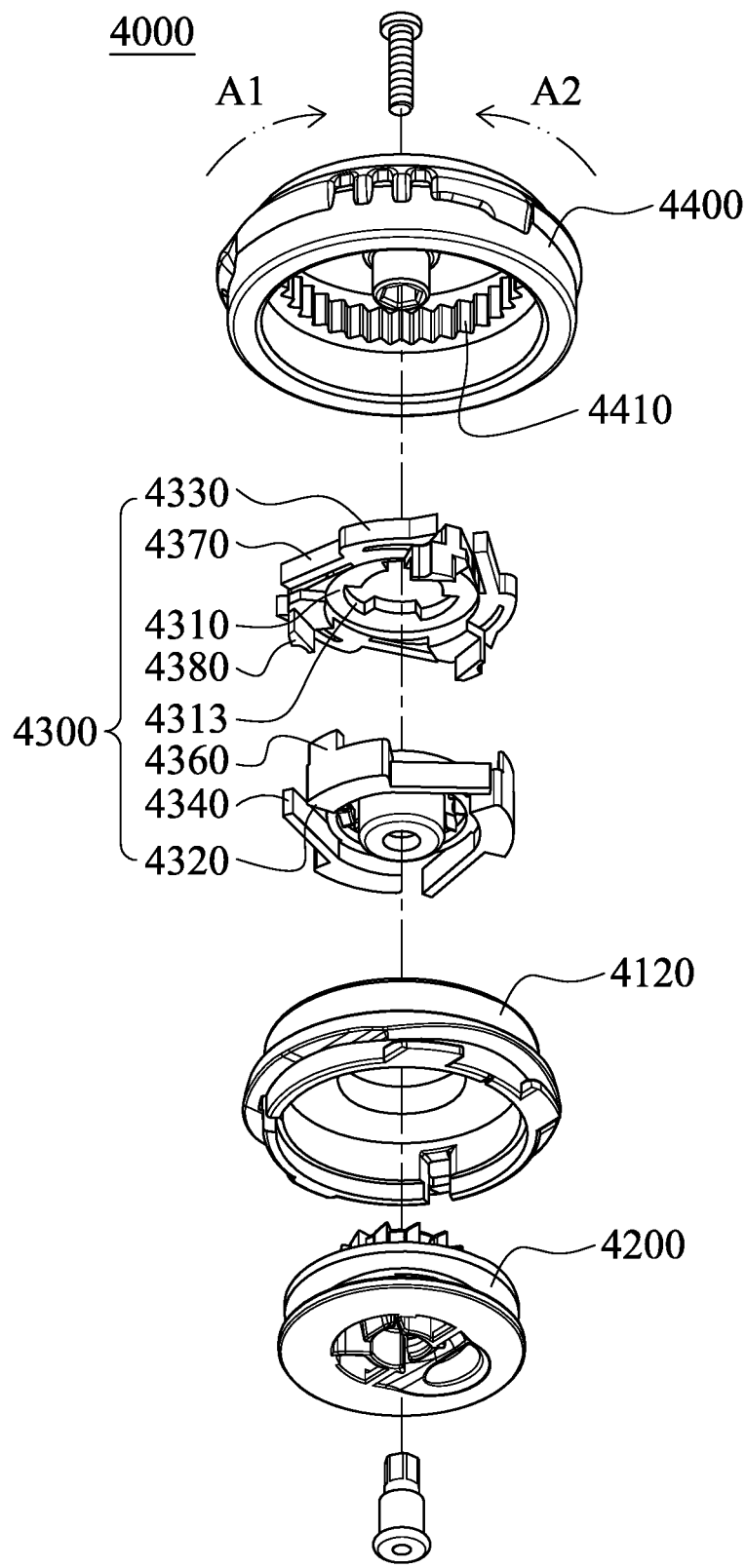
FIG. 21 is another exploded view of the fastening device of the fourth embodiment of FIG. 20.

FIG. 20 is one exploded view of a fastening device 4000 according to a fourth embodiment of the present disclosure. FIG. 21 is another exploded view of the fastening device 4000 of the fourth embodiment of FIG. 20. The fastening device 4000 includes a case (not labeled in the fourth embodiment) including a plurality of engaging teeth 4140, a spool 4200 disposed at the case and configured for a lace to be wound therearound, a knob 4400 covering the case and including a plurality of knob teeth 4410, and an engaging unit 4300 disposed at the case and coupled to the spool 4200. The engaging unit 4300 includes at least one pawl arm 4340 selectively coupled to at least one of the engaging teeth 4140. As the knob 4400 is rotated in a tensioning direction A2, the engaging unit 4300 is rotated to drive the spool 4200 to tension the lace, and as the knob 4400 is rotated in a releasing direction A1, the at least one pawl arm 4340 is incrementally and radially deflected, a tension of the lace causes the at least one pawl arm 4340 to be fully disengaged from at least one of the engaging teeth 4140 to offset a friction temporarily, thereby allowing the lace to be incrementally released. It is noted that, the base of the case is omitted in the fourth embodiment, and the structure similar to the first embodiment will not be repeated.

Precisely, the case may further include a housing 4120 for the engaging teeth 4140 to be disposed thereat. The knob teeth 4410 are located at an inner side wall of the knob 4400, and no interval shown in the first embodiment is contained between the knob teeth 4410 that are adjacent to each other. The shape of the knob tooth 4410 is identical to the shape of the engaging tooth 4140.

The engaging unit 4300 may further include an upper disc 4310, a lower disc 4320 and driving arms 4330, the lower disc 4320 is located below the upper disc 4310, the pawl arms 4340 are located at the lower disc 4320, the driving arms 4330 are located at the upper disc 4310, and the driving arms 4330 are coupled to the knob teeth 4410.

Figure 22:
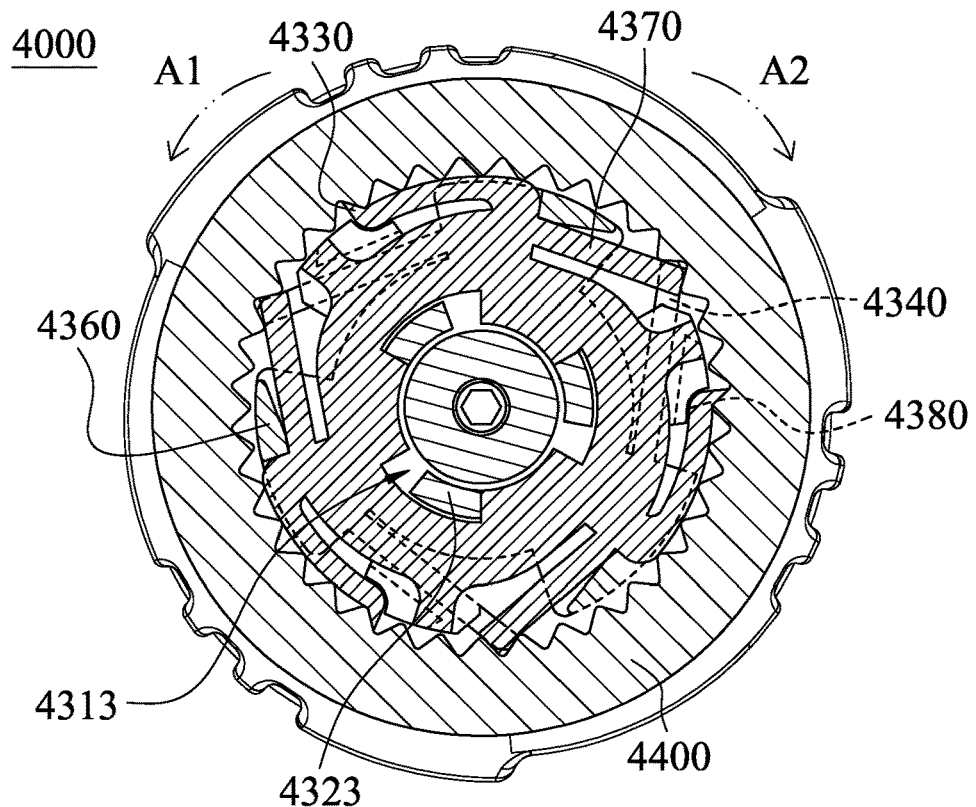
FIG. 22 is one cross-section top view of the fastening device of the fourth embodiment of FIG. 20.
Figure 23:
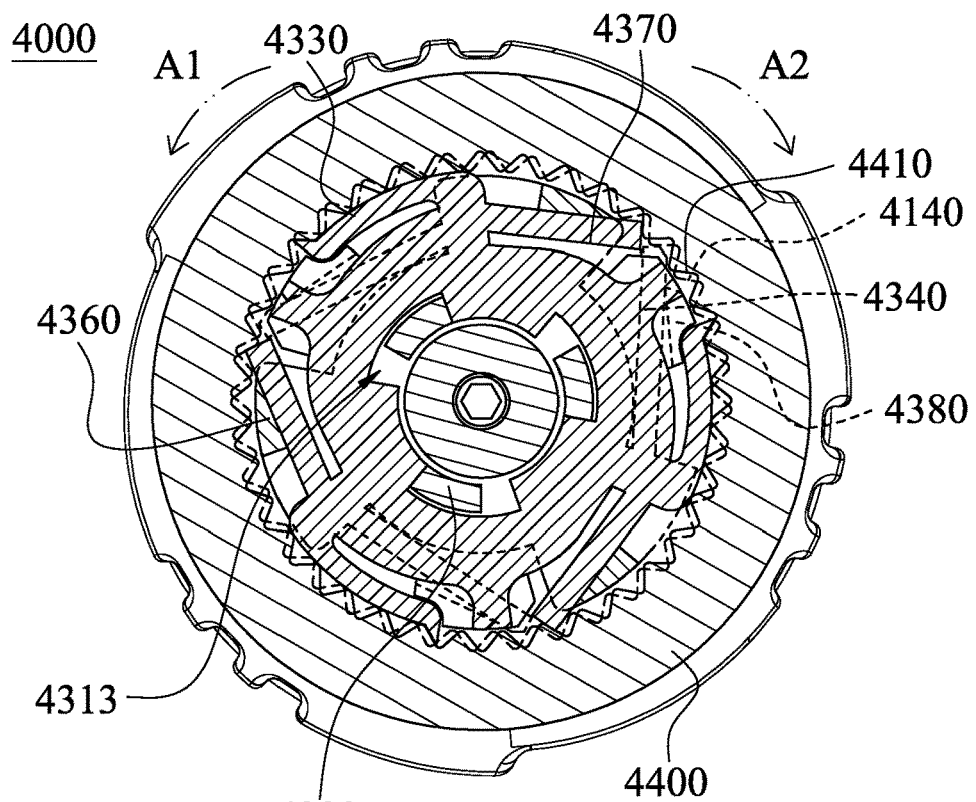
FIG. 23 is another cross-section top view of the fastening device of the fourth embodiment of FIG. 20.
Figure 24:
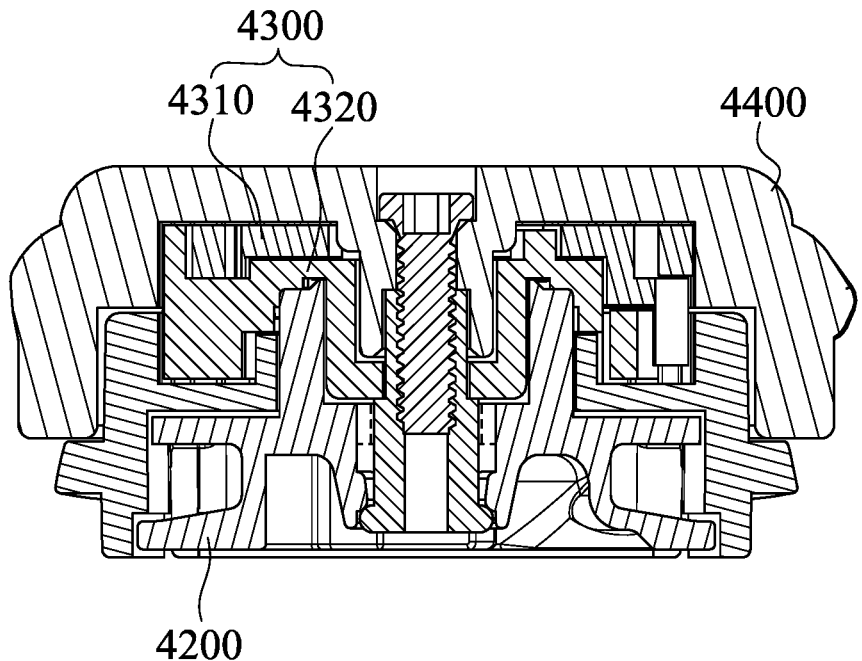
FIG. 24 is one cross-section side view of the fastening device of the fourth embodiment of FIG. 20.
Figure 25:
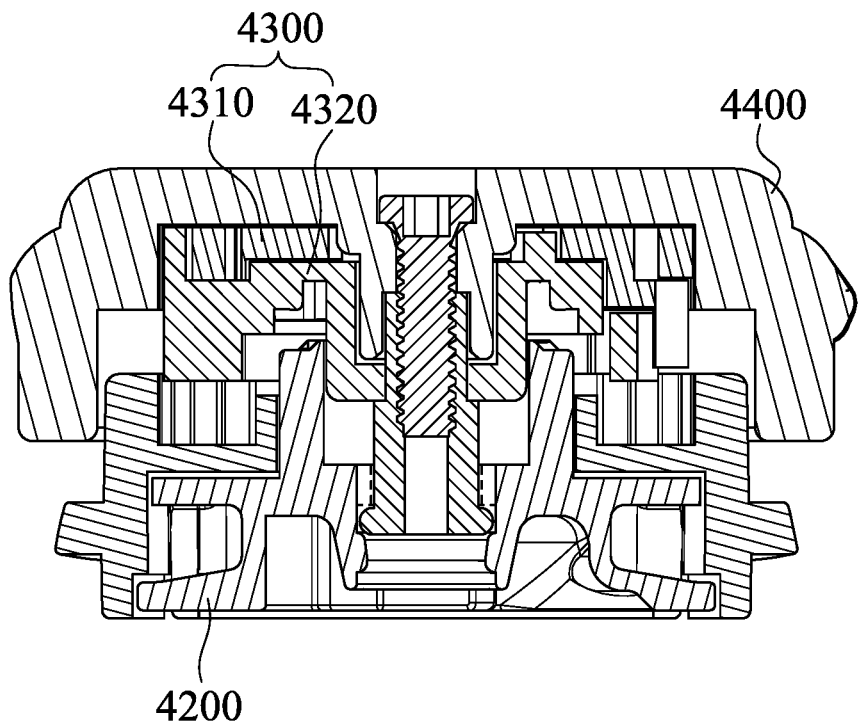
FIG. 25 is another cross-section side view of the fastening device of the fourth embodiment of FIG. 20.

FIG. 22 is one cross-section top view of the fastening device 4000 of the fourth embodiment of FIG. 20. FIG. 23 is another cross-section top view of the fastening device 4000 of the fourth embodiment of FIG. 20. FIG. 24 is one cross-section side view of the fastening device 4000 of the fourth embodiment of FIG. 20. FIG. 25 is another cross-section side view of the fastening device 4000 of the fourth embodiment of FIG. 20. As shown in FIGS. 20 to 22, the upper disc 4310 may include three accommodating grooves 4313 arranged with intervals. The lower disc 4320 may include three radial tabs 4323, each of the radial tabs 4323 may be received in each of the accommodating grooves 4313, and the upper disc 4310 is allowed to be rotated relative to the lower disc 4320 in a range within each of the accommodating groove 4313. In addition, the engaging unit 4300 may further include three pressing blocks 4360, three rotating arms 4370 and three pushing blocks 4380. The three rotating arms 4370 are disposed at the upper disc 4310 with intervals and correspond to the knob teeth 4410. The three pushing blocks 4380 are also disposed at the upper disc 4310 with intervals and extend downward. The three pressing blocks 4360 are disposed at the lower disc 4320 with intervals and respectively correspond to the three rotating arms 4370. As the knob 4400 is rotated in the releasing direction A1, the rotating arm 4370 is pressed by the pressing block 4360, and the upper disc 4310 is allowed to rotate relative to the lower disc 4320, thereby allowing the pushing block 4380 to incrementally deflect the pawl arm 4340. In other embodiments, a number of the pressing blocks, a number of the rotating arms, a number of the pushing blocks and a number of the pawl arms are at least one, and the present disclosure is not limited thereto.

Hence, as shown in FIGS. 22 and 24, the knob 4400 is not pulled upward and is in the first position. As the knob 4400 is rotated in the tensioning direction A2 to rotate the upper disc 4310 for allowing one side wall of the accommodating groove 4313 to push the radial tab 4323, the lower disc 4320 will also be rotated to drive the spool 4200 to tension the lace. As the knob 4400 stops rotating, the lace cannot be released owing to the engagement between the pawl arm 4340 and the engaging teeth 4140.

On the contrary, as the knob 4400 is rotated in the releasing direction A1, the knob teeth 4410 push the rotating arms 4370 in the releasing direction A1, and the rotating arms 4370 are pressed by the pressing blocks 4360 so as to disengage from the knob teeth 4410, thereby allowing the upper disc 4310 to rotate relative to the lower disc 4320. Meanwhile, the pushing blocks 4380 close the pawl arms 4340 to incrementally deflect the pawl arms 4340, but since the pawl arms 4340 are not fully disengaged from the engaging teeth 4140, the lace will not be fully released at this time, and the tension of the lace that pulls the spool 4200 in the releasing direction A1 can be remained. As the tension of the lace is larger than the friction between the pawl arms 4340 and the engaging teeth 4140, the pawl arms 4340 will be fully released to allow the lace to pull the spool 4200 in the releasing direction A1 such that the pushing blocks 4380 deflect the pawl arms 4340 to allow the pawl arms 4340 to engage with the engaging teeth 4140 again, and the spool 4200 stops rotating. Therefore, one segment of the lace can be released, and the goal of incremental releasing of the lace can be achieved. It is noted that, the pawl arm 4340 may include a notch to assist the pawl arm 4340 to be smoothly released, but the present disclosure is not limited thereto. Furthermore, as shown in FIG. 25, the knob 4400 may be pulled up to a second position, and the lace may be fully released.

Figure 26:
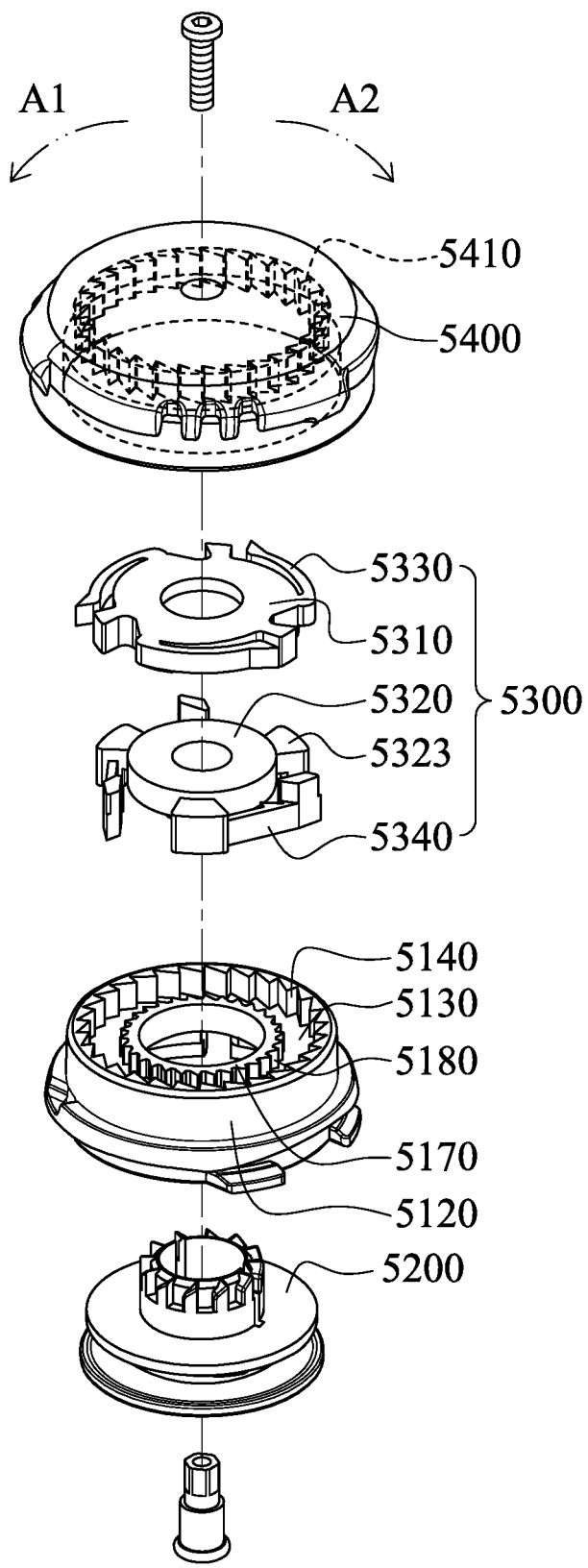
FIG. 26 is one exploded view of a fastening device according to a fifth embodiment of the present disclosure.
Figure 27:
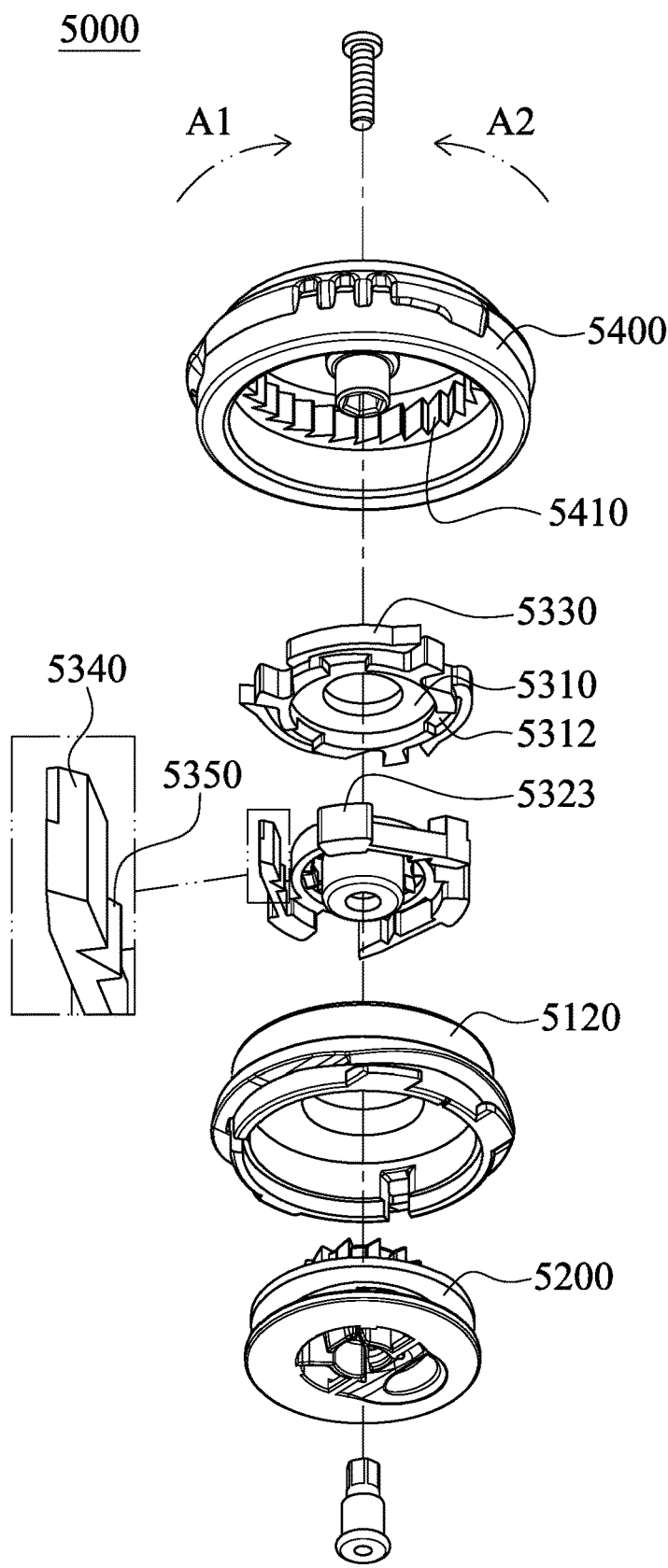
FIG. 27 is another exploded view of the fastening device of the fifth embodiment of FIG. 26.

FIG. 26 is one exploded view of a fastening device 5000 according to a fifth embodiment of the present disclosure. FIG. 27 is another exploded view of the fastening device 5000 of the fifth embodiment of FIG. 26. The fastening device 5000 of the fifth embodiment is similar to the fastening device 1000 of the first embodiment and includes a case (not labeled in the fifth embodiment), a spool 5200, an engaging unit 5300, a knob 5400 and a connecting unit (not labeled in the fifth embodiment). The case includes a housing 5120 and a plurality of engaging teeth 5140. The engaging unit 5300 includes an upper disc 5310, a lower disc 5320, driving arms 5330, pawl arms 5340 and abutting members 5350. The knob 5400 includes a plurality of knob teeth 5410, and only the differences thereof are mentioned hereinafter. It is noted that, in the fifth embodiment, the base of the case is omitted.

The knob teeth 5410 are located at an inner side wall of the knob 5400. The upper disc 5310 includes three engaging cavities 5312, the lower disc 5320 includes three radial tabs 5323, and each of the radial tabs 5323 is correspondingly engaged with each of the engaging cavities 5312. Each of the pawl arms 5340 extends from one side of each radial tab 5323 toward the releasing direction A1, and each of the abutting members 5350 may have a toothed structure and is located at an inner side of each of the pawl arms 5340.

The case may further include a gear ring 5170 and a plurality of stopping teeth 5180. The gear ring 5170 extends upward from the partition 5130, and the stopping teeth 5180 are located at the gear ring 5170 and face toward the engaging teeth 5140.

Figure 28:
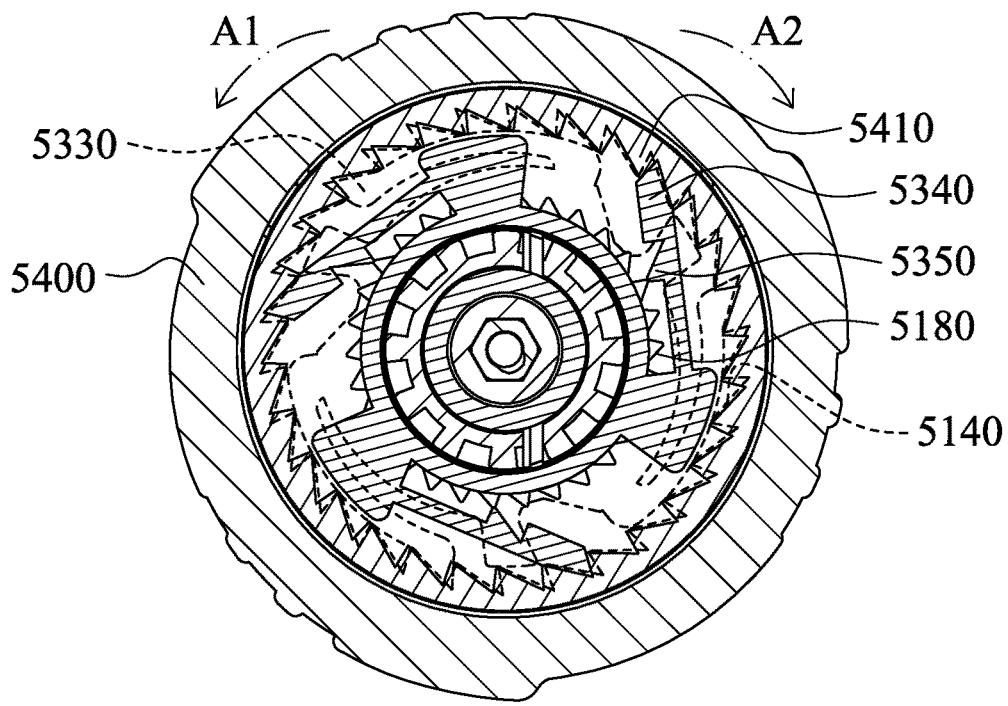
FIG. 28 is one cross-section top view of the fastening device of the fifth embodiment of FIG. 26.
Figure 29:
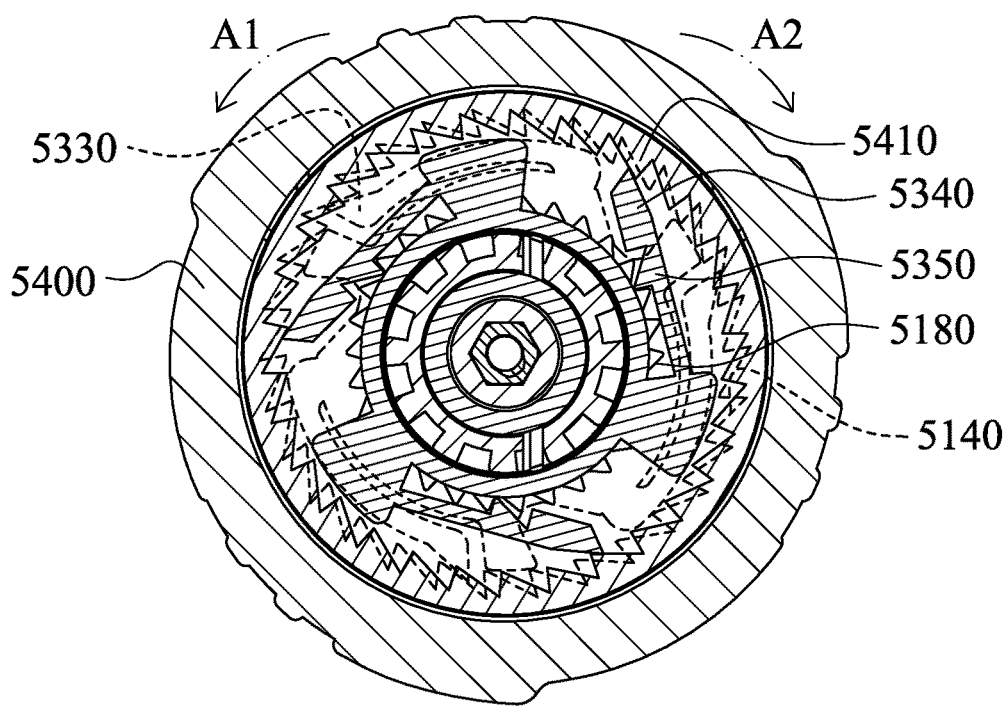
FIG. 29 is another cross-section top view of the fastening device of the fifth embodiment of FIG. 26.
Figure 30:
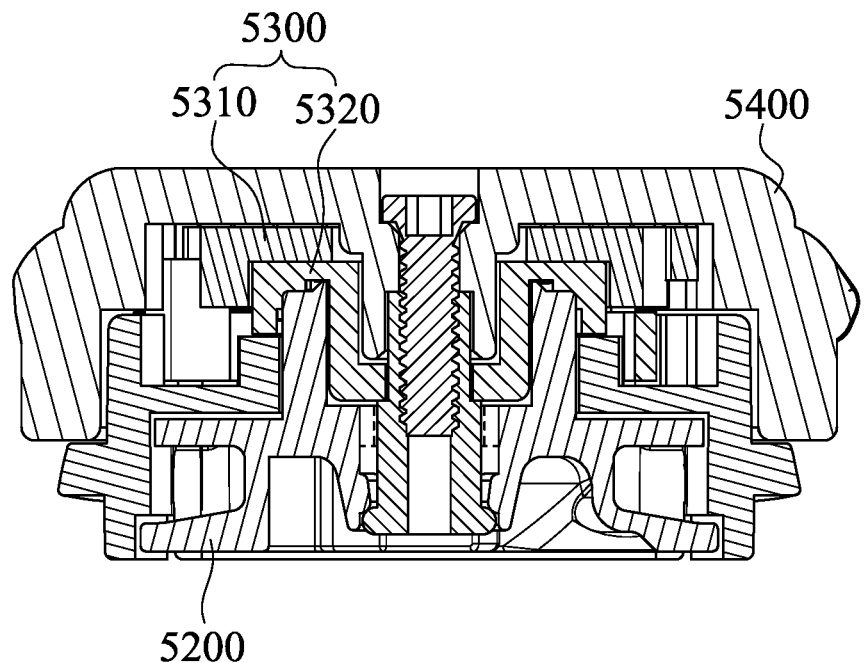
FIG. 30 is one cross-section side view of the fastening device of the fifth embodiment of FIG. 26.
Figure 31:
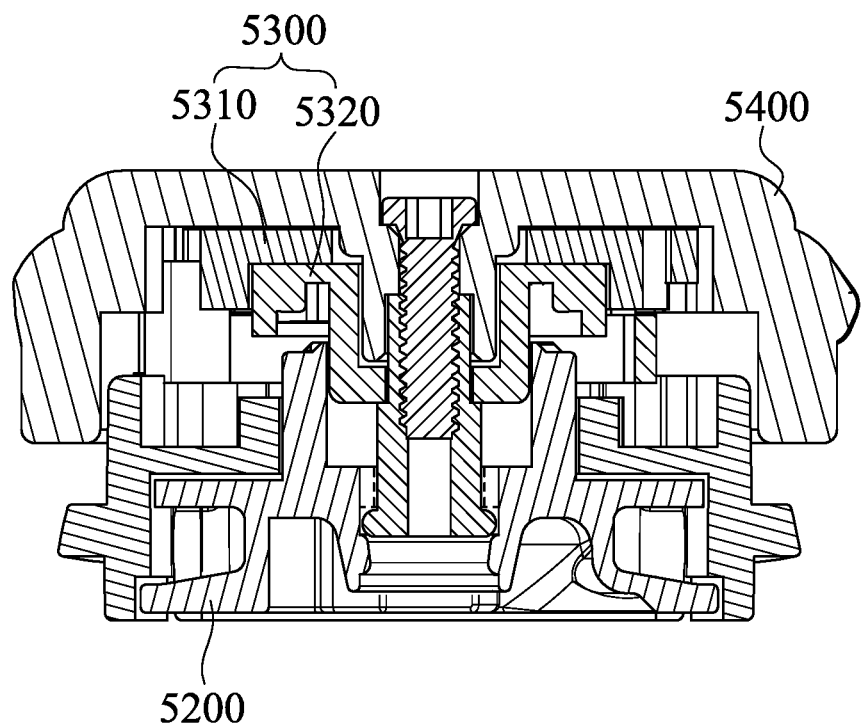
FIG. 31 is another cross-section side view of the fastening device of the fifth embodiment of FIG. 26.

FIG. 28 is one cross-section top view of the fastening device 5000 of the fifth embodiment of FIG. 26. FIG. 29 is another cross-section top view of the fastening device 5000 of the fifth embodiment of FIG. 26. FIG. 30 is one cross-section side view of the fastening device 5000 of the fifth embodiment of FIG. 26. FIG. 31 is another cross-section side view of the fastening device 5000 of the fifth embodiment of FIG. 26. As shown in FIGS. 28 and 30, the knob 5400 is not pulled up and is in the first position, the lower disc 5320 may be located above the partition 5130, the pawl arm 5340 corresponds to the engaging teeth 5140, and the abutting member 5350 faces the gear ring 5170 but not engages with the stopping teeth 5180. As rotating the knob 5400 in the tensioning direction A2 to rotate the engaging unit 5300, the pawl arm 5340 will be disengaged from the engaging teeth 5140, thereby allowing the spool 5200 to tension the lace.

On the contrary, as shown in FIG. 29, as the knob 5400 is rotated in the releasing direction A1, the knob teeth 5410 deflect the pawl arm 5340 to allow the pawl arm 5340 to disengage from the engaging teeth 5140, the pawl arm 5340 swings inward such that the abutting member 5350 is engaged with the stopping teeth 5180, the lace will not be fully released at this time, and the tension of the lace to pull the spool 5200 in the releasing direction A1 is remained. As the tension of the lace is larger than a friction between the abutting member 5350 and the stopping teeth 5180, the tension of the lace pulls the spool 5200 to rotate in the releasing direction A1, the abutting member 5350 is deflected, and the spool 5200 may be rotated in the releasing direction A1. Then, the pawl arm 5340 is engaged with the engaging teeth 5140 again, which causes the spool 5200 to stop rotating, and the abutting member 5350 is disengaged from the stopping teeth 5180. Therefore, one segment of the lace can be released, and the goal of incremental releasing of the lace can be achieved. Moreover, as shown in FIG. 31, as the knob 5400 is pulled upward to be located at a second position, the lace may be fully released.

Figure 32:
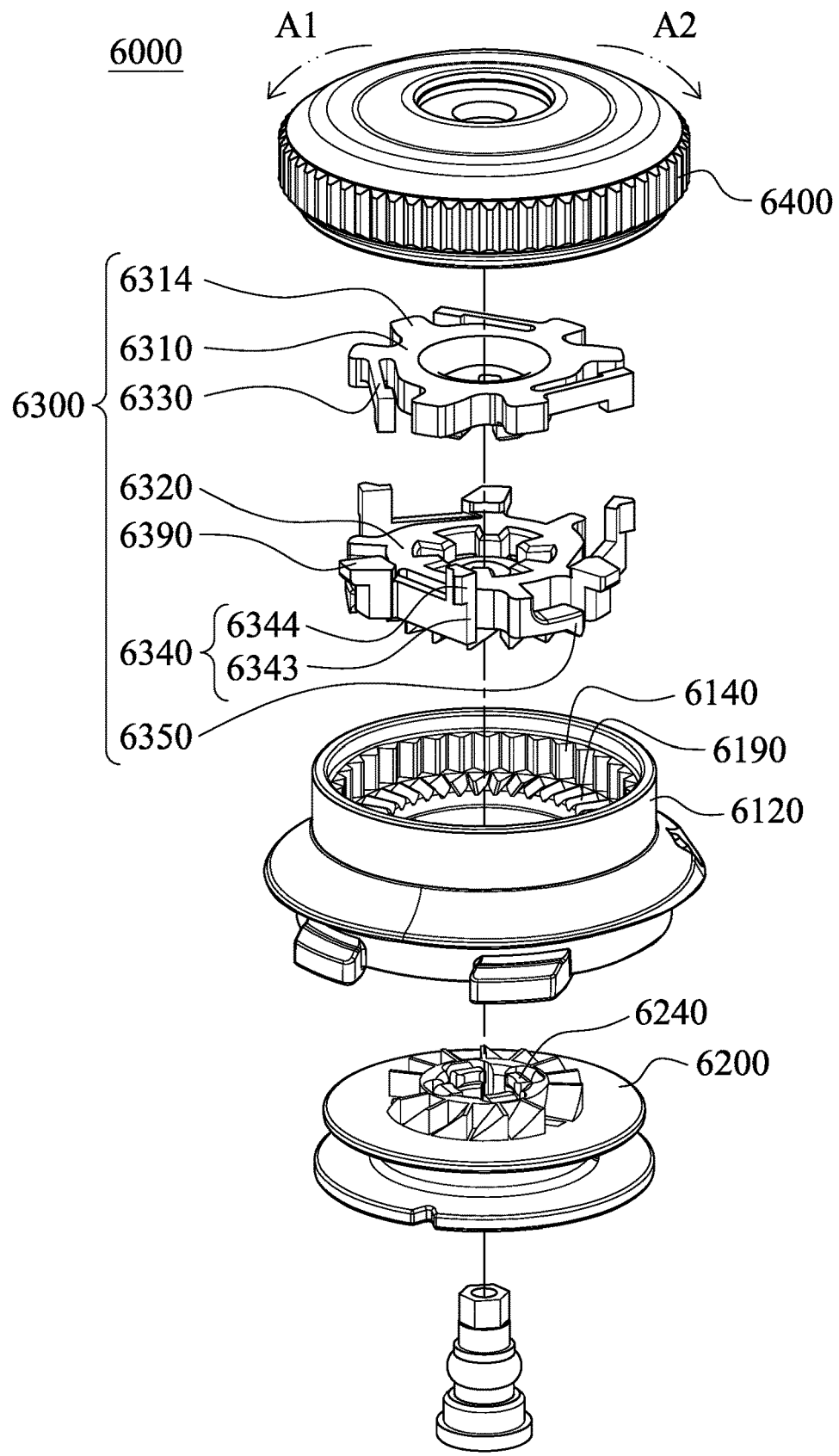
FIG. 32 is one exploded view of a fastening device according to a sixth embodiment of the present disclosure.
Figure 33:
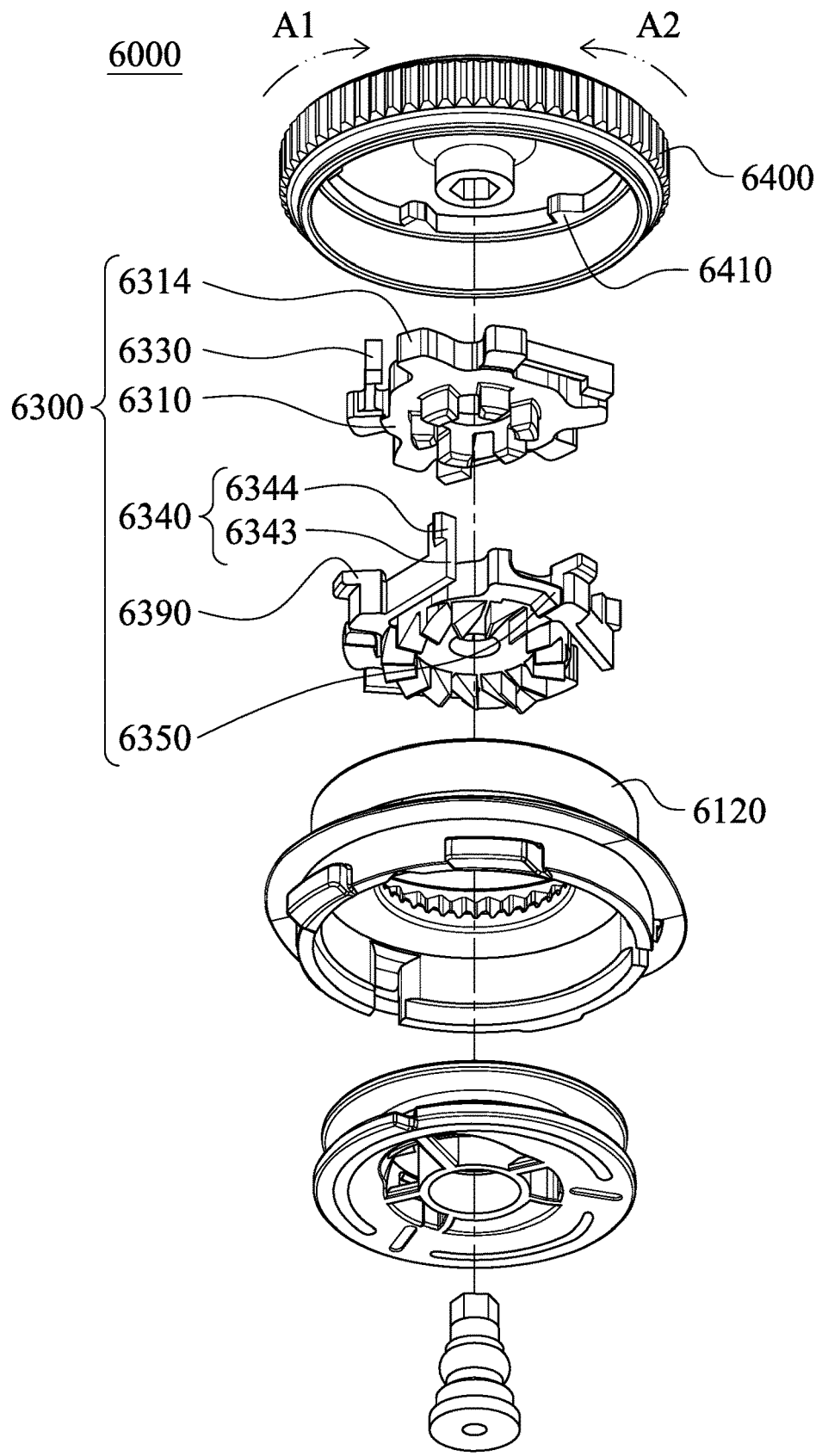
FIG. 33 is another exploded view of the fastening device of the sixth embodiment of FIG. 32.
Figure 34:
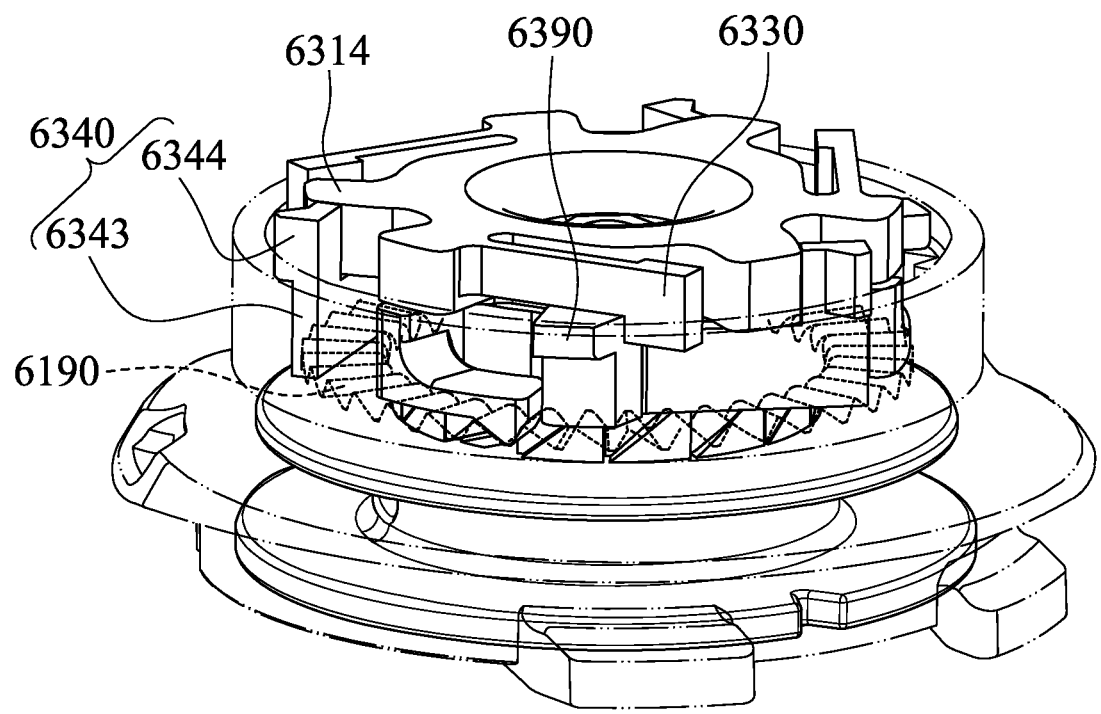
FIG. 34 is a partial three-dimensional schematic view of the fastening device of the sixth embodiment of FIG. 32.

FIG. 32 is one exploded view of a fastening device 6000 according to a sixth embodiment of the present disclosure. FIG. 33 is another exploded view of the fastening device 6000 of the sixth embodiment of FIG. 32. FIG. 34 is a partial three-dimensional schematic view of the fastening device 6000 of the sixth embodiment of FIG. 32. The fastening device 6000 of the sixth embodiment is similar to the fastening device 1000 of the first embodiment and includes a case (not labeled in the sixth embodiment), a spool 6200, an engaging unit 6300, a knob 6400 and a connecting unit (not labeled in the sixth embodiment). The case includes a housing 6120 and a plurality of engaging teeth 6140. The engaging unit 6300 includes an upper disc 6310, a lower disc 6320, driving arms 6330, pawl arms 6340 and abutting members 6350. The knob 6400 includes a plurality of knob teeth 6410, and only the differences thereof are mentioned hereinafter. It is noted that, in the sixth embodiment, the base of the case and the screw member of connecting unit is omitted.

As shown in FIGS. 32 and 33, the engaging unit 6300 may further include three resting blocks 6390, each resting block 6390 is located between a distal end of the abutting member 6350 and a proximal end of the pawl arm 6340 adjacent thereto, and each resting block 6390 is configured to correspond to each driving arm 6330 at the upper disc 6310. The upper disc 6310 may include three stopping blocks 6314 extending radially and outward therefrom. Each stopping block 6314 may be located between two adjacent driving arms 6330 and correspond to each pawl arm 6340 at the lower disc 6320. The pawl arm 6340 may include a lower arm portion 6343 and an upper protrusion 6344, the lower arm portion 6343 is configured to engage with the engaging teeth 6140, and the upper protrusion 6344 extends upward and integrally from the lower arm portion 6343 along an axial direction. A radial distance between the outer most edge of the upper protrusion 6344 and a center of the lower disc 6320 is larger than a radial distance between the outer most edge of the lower arm portion 6343 and the center of the lower disc 6320. Hence, as the upper disc 6310 is engaged with the lower disc 6320, the upper disc 6310 is rotatable with the lower disc 6320, and the upper protrusion 6344 will protrude into the gap between the driving arm 6330 and the stopping block 6314. One side surface of the upper protrusion 6344 is abutted against one side surface of the stopping block 6314, and one side surface of the driving arm 6330 is abutted against one side surface of the resting block 6390.

The case may include a plurality of depressions 6190 located at the partition. In other words, with the axial concave and convex shapes on the upper surface of the partition, the depressions 6190 can be formed on the partition. The abutting member 6350 with a toothed structure can correspond to at least one of the depressions 6190. The spool 6200 may include a positioning portion 6240 extends upward, and the positioning portion 6240 may be configured to position the positioning protrusion of the central shaft.

Moreover, as shown in FIG. 33, the knob teeth 6410 of the knob 6400 are not circularly arranged at an inner side wall of the knob 6400, and six knob teeth 6140 are arranged with intervals, but the present disclosure is not limited thereto.

Figure 35:
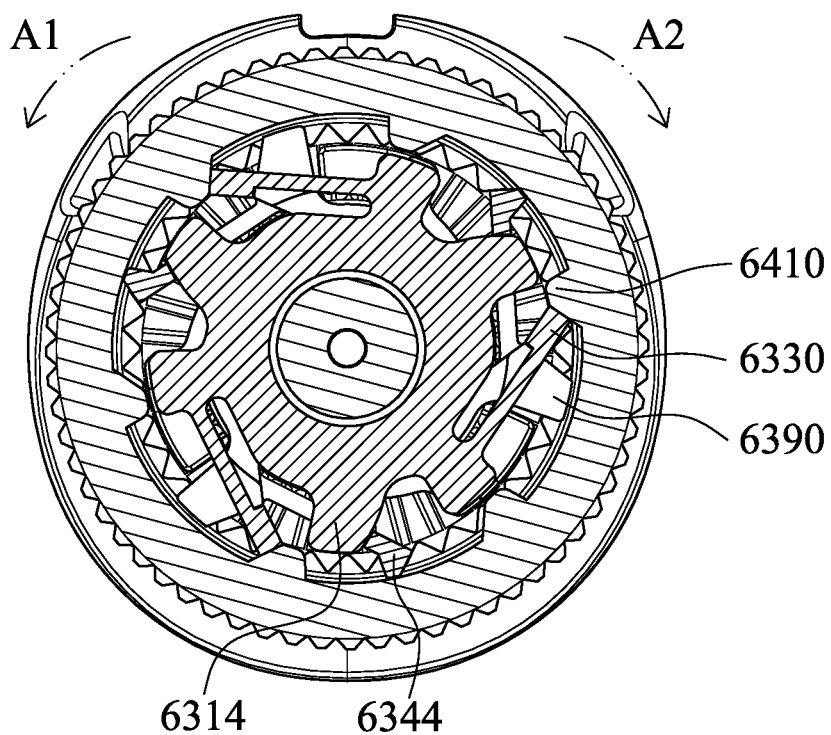
FIG. 35 is one cross-section top view of the fastening device of the sixth embodiment of FIG. 32.
Figure 36:
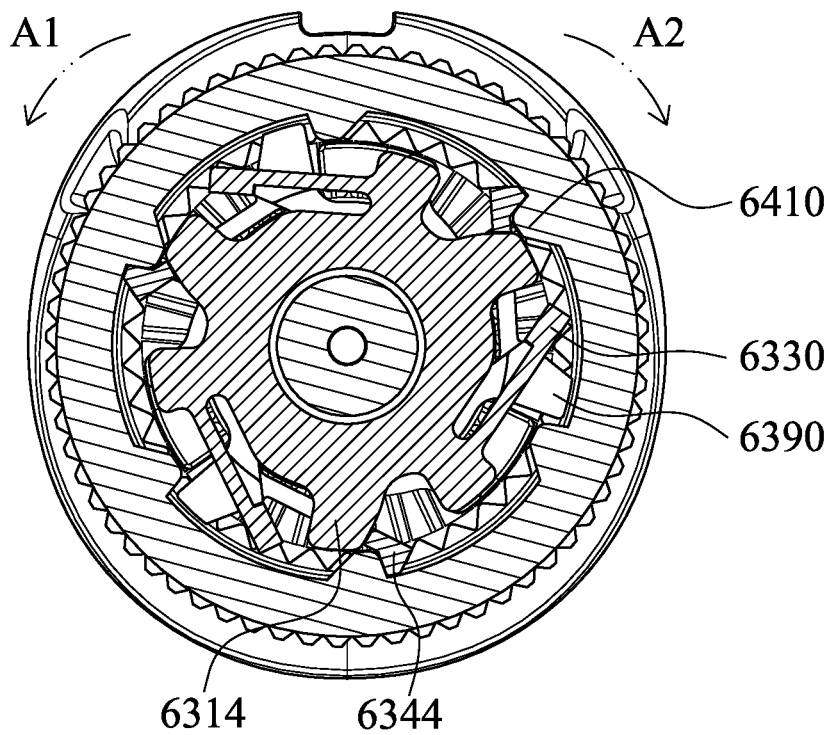
FIG. 36 is another cross-section top view of the fastening device of the sixth embodiment of FIG. 32.
Figure 37:
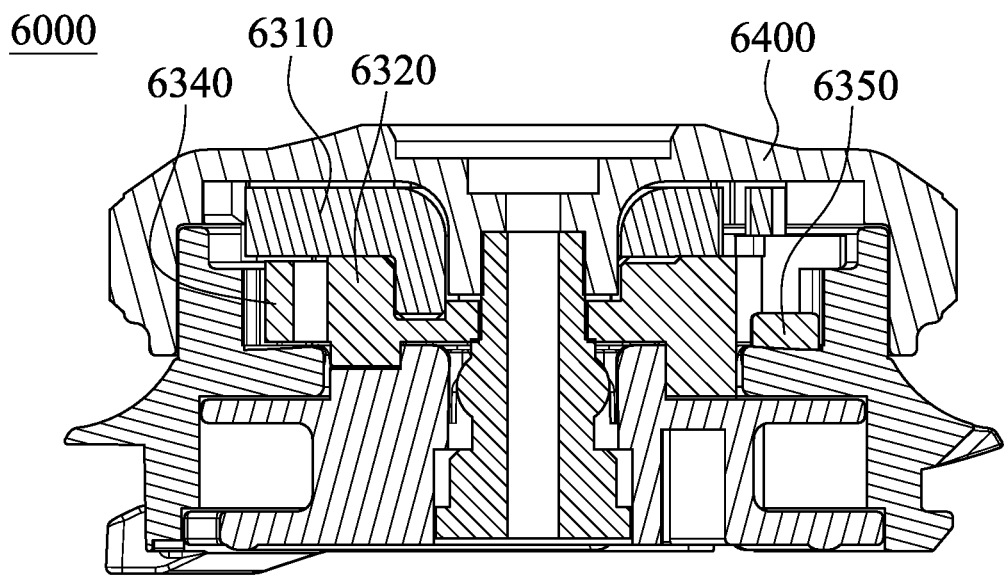
FIG. 37 is one cross-section side view of the fastening device of the sixth embodiment of FIG. 32.
Figure 38:
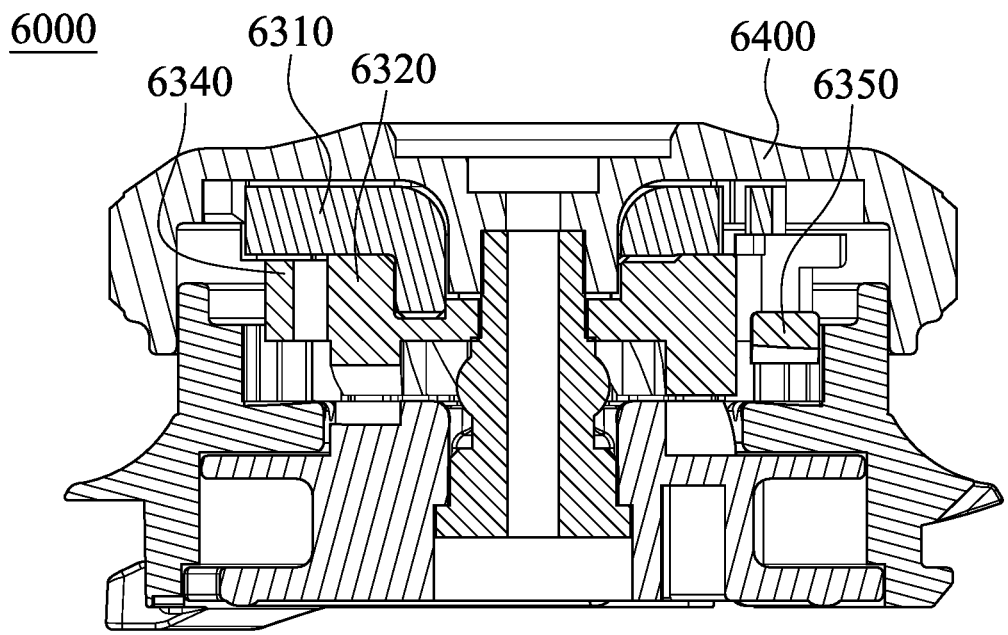
FIG. 38 is another cross-section side view of the fastening device of the sixth embodiment of FIG. 32.

FIG. 35 is one cross-section top view of the fastening device 6000 of the sixth embodiment of FIG. 32. FIG. 36 is another cross-section top view of the fastening device 6000 of the sixth embodiment of FIG. 32. FIG. 37 is one cross-section side view of the fastening device 6000 of the sixth embodiment of FIG. 32. FIG. 38 is another cross-section side view of the fastening device 6000 of the sixth embodiment of FIG. 32. As shown in FIGS. 34, 35 and 37, the knob 6400 is not pulled up and is in the first position, the positioning protrusion of the central shaft is located below the positioning portion 6240 (the positioning portion 6240 is not illustrated in the cross-section side view in the drawings owning to the view angle thereof), and the lower arm portion 6343 of the pawl arm 6340 is correspondingly engaged with the engaging teeth 6140. As the knob 6400 is rotated in the tensioning direction A2, the knob teeth 6410 of the knob 6400 push the driving arms 6330 to rotate the lower disc 6320, and the spool 6200 is rotated to tension the lace. As the knob 6400 stops rotating, the lace may not be released owing to the engagement between the pawl arm 6340 and the engaging teeth 6140. It is noted that, since the driving arm 6330 will rest on the resting block 6390 as being forced, broken of the driving arm 6330 may be avoided, and the structural strength may be increased.

As shown in FIGS. 34, 36 and 37, as the knob 6400 is rotated in the releasing direction A1, the upper protrusion 6344 of the pawl arm 6340 is deflected as being pushed by the knob teeth 6410, and the lower arm portion 6343 of the pawl arm 6340 is disengaged from the knob teeth 6140. Since the abutting member 6350 is engaged with the depressions 6190, the lace will not be fully released at this time, and the tension of the lace to pull the spool 6200 in the releasing direction A1 is remained. As the tension of the lace is larger than a friction between the abutting member 6350 and the depressions 6190, the tension of the lace pulls the spool 6200 to rotate in the releasing direction A1, the abutting member 6350 is deflected, and the spool 6200 may be rotated in the releasing direction A1. Then, the lower arm portion 6343 of the pawl arm 6340 is engaged with the engaging teeth 6140 again, and the spool 6200 is allowed to stop rotating. Therefore, one segment of the lace can be released, and the goal of incremental releasing of the lace can be achieved. It is noted that, since the upper protrusion 6344 of the pawl arm 6340 will be restricted by the stopping block 6314, broken of the pawl arm 6340 is avoided, and the structural strength is increased. Furthermore, it is also noted that, as the knob 6400 is rotated in the releasing direction A1, the knob teeth 6140 use a first force to deflect the pawl arm 6340 and use a second force to deflect the driving arm 6330, and the first force and the second force are smaller than the friction between the abutting members 6350 and the depressions 6190, thereby allowing the abutting members 6350 to remain the tension of the lace. In other embodiments, if the knob deflects the pawl arms and the driving arms at the same time, a sum of the first force and the second force is smaller than the friction generated from the abutting members.

Moreover, as shown in FIG. 38, as the knob 6400 is pulled upward to be located at a second position, the positioning protrusion of the central post is above the positioning portion 6240, and the lace may be fully released.

Figure 39:
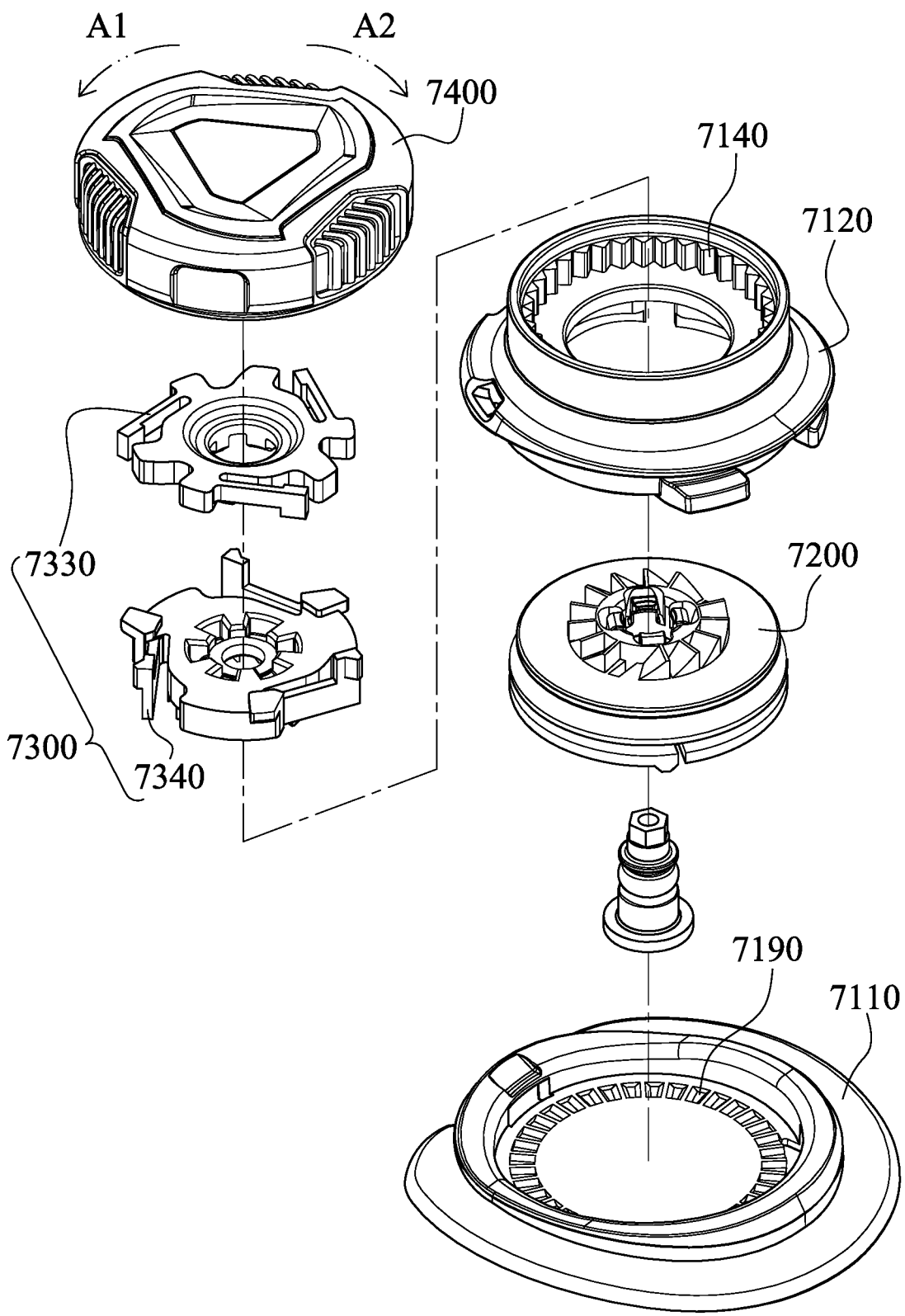
FIG. 39 is one exploded view of a fastening device according to a seventh embodiment of the present disclosure.
Figure 40:
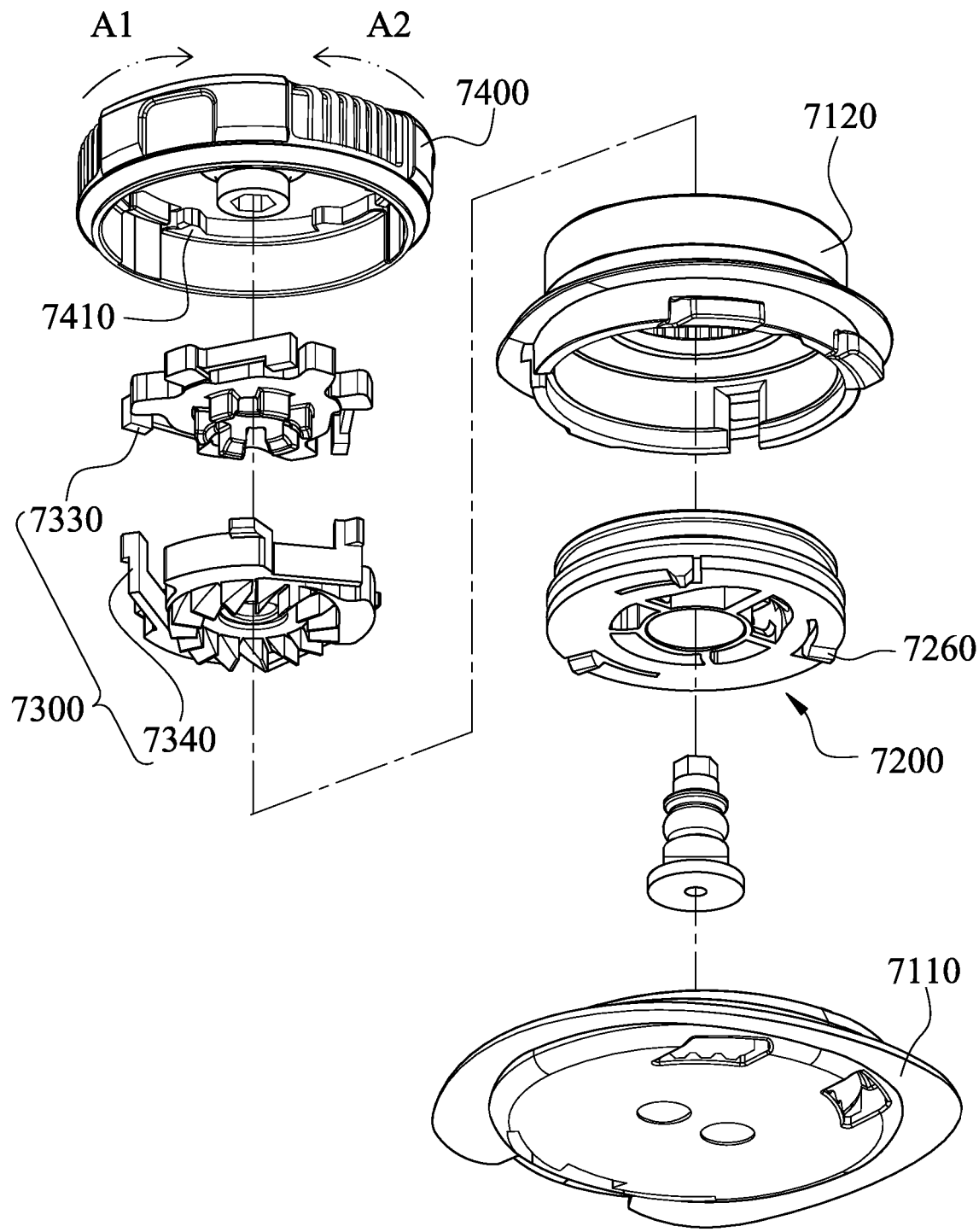
FIG. 40 is another exploded view of the fastening device of the seventh embodiment of FIG. 39.

FIG. 39 is one exploded view of a fastening device 7000 according to a seventh embodiment of the present disclosure. FIG. 40 is another exploded view of the fastening device 7000 of the seventh embodiment of FIG. 39. The fastening device 7000 of the seventh embodiment is similar to the fastening device 6000 of the six embodiment and includes a case (not labeled in the seventh embodiment), a spool 7200, a knob 7400, at least one pawl arm 7340 and at least one abutting member 7260. The case includes a housing 7120, a plurality of engaging teeth 7140 and a base 7110. The knob 7400 includes a plurality of knob teeth 7410.

Similarly, as the knob 7400 is rotated in a releasing direction A1 to allow the at least one pawl arm 7340 to disengage from at least one of the engaging teeth 7140, the at least one abutting member 7260 is deflected by a tension of the lace to offset a friction temporarily, thereby allowing the lace to be incrementally released.

In the seventh embodiment, the fastening device 7000 also includes an engaging unit 7300, and the engaging unit 7300 includes an upper disc 7310 (labeled in FIG. 41), a lower disc 7320 (labeled in FIG. 41), at least one driving arm 7330 and the pawl arm 7340. The difference is that the engaging unit 7300 does not include the abutting members 6350 located at the lower disc 6320 as the engaging unit 6300, and, as shown in FIGS. 39 and 40, the spool 7200 includes the abutting members 7260 extending downward from the lower ring portion instead. Moreover, a plurality of depressions 7190 of the case are located at a surface of the base 7110.

Figure 41:
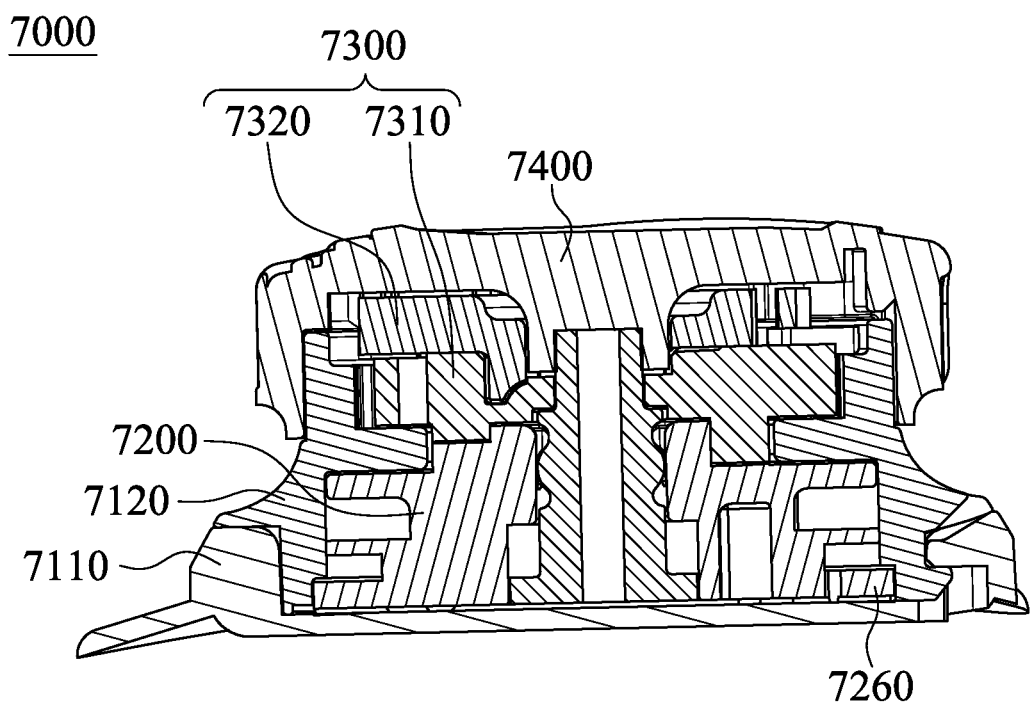
FIG. 41 is one cross-section side view of the fastening device of the seventh embodiment of FIG. 39.
Figure 42:
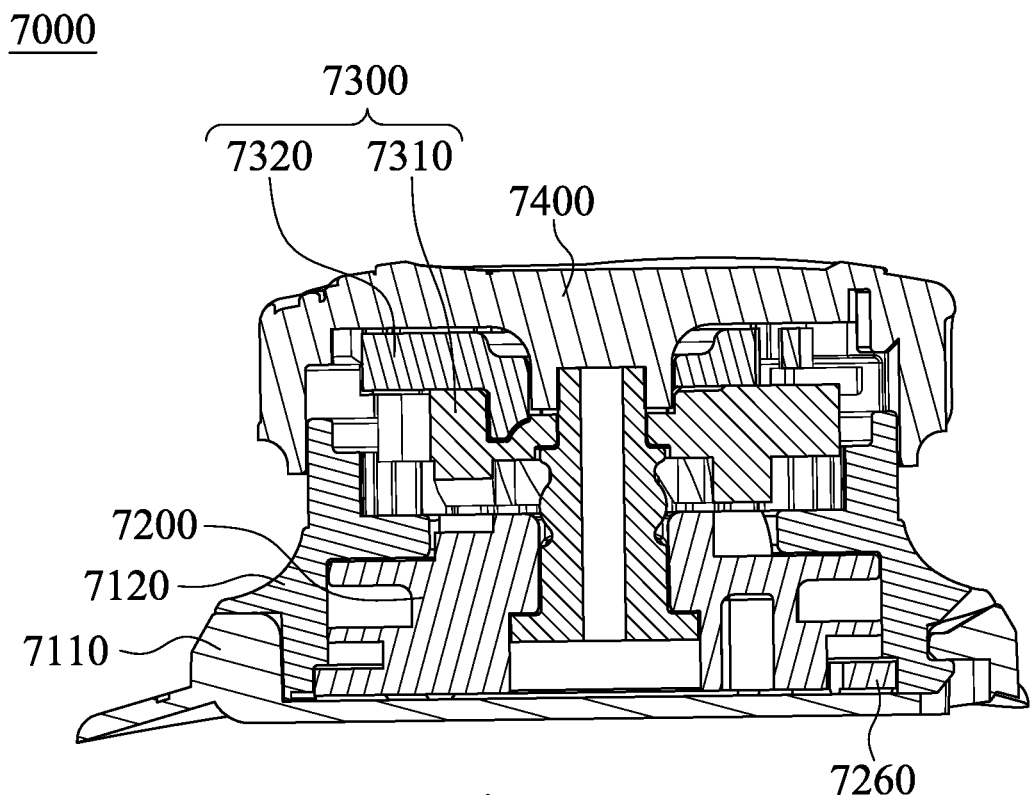
FIG. 42 is another cross-section side view of the fastening device of the seventh embodiment of FIG. 39.

FIG. 41 is one cross-section side view of the fastening device 7000 of the seventh embodiment of FIG. 39. FIG. 42 is another cross-section side view of the fastening device 7000 of the seventh embodiment of FIG. 39. Please refer to FIGS. 41 and 42 with references of FIGS. 39 and 40, as the knob 7400 is rotated in the releasing direction A1, the knob teeth 7410 deflect the pawl arm 7340 to disengage from the engaging teeth 7140. Since the abutting members 7260 are engaged with the depressions 7190, the lace will not be fully released at this time, and the tension of the lace to pull the spool 7200 in the releasing direction A1 is remained. As the tension of the lace is larger than a friction between the abutting members 7260 and the depressions 7190, the tension of the lace pulls the spool 7200 to rotate in the releasing direction A1, the abutting member 7260 is deflected, and the spool 7200 may be rotated in the releasing direction A1. Then, the pawl arm 7340 is engaged with the engaging teeth 7140 again, and the spool 7200 is allowed to stop rotating. Therefore, one segment of the lace can be released, and the goal of incremental releasing of the lace can be achieved. Moreover, as shown in FIG. 42, as the knob 7400 is pulled upward to be located at a second position, the lace may be fully released.

Figure 43:
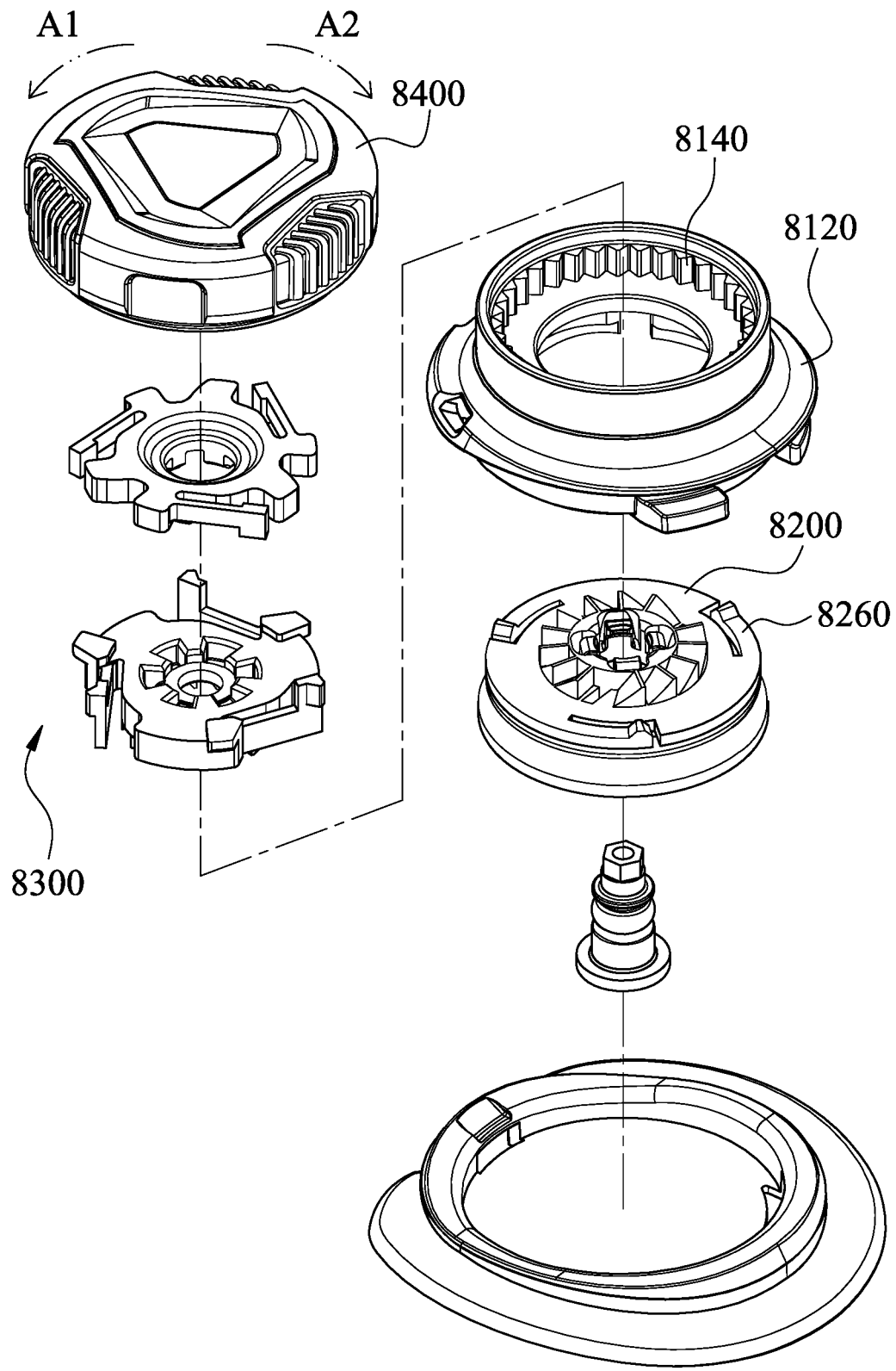
FIG. 43 is one exploded view of a fastening device according to an eighth embodiment of the present disclosure.
Figure 44:
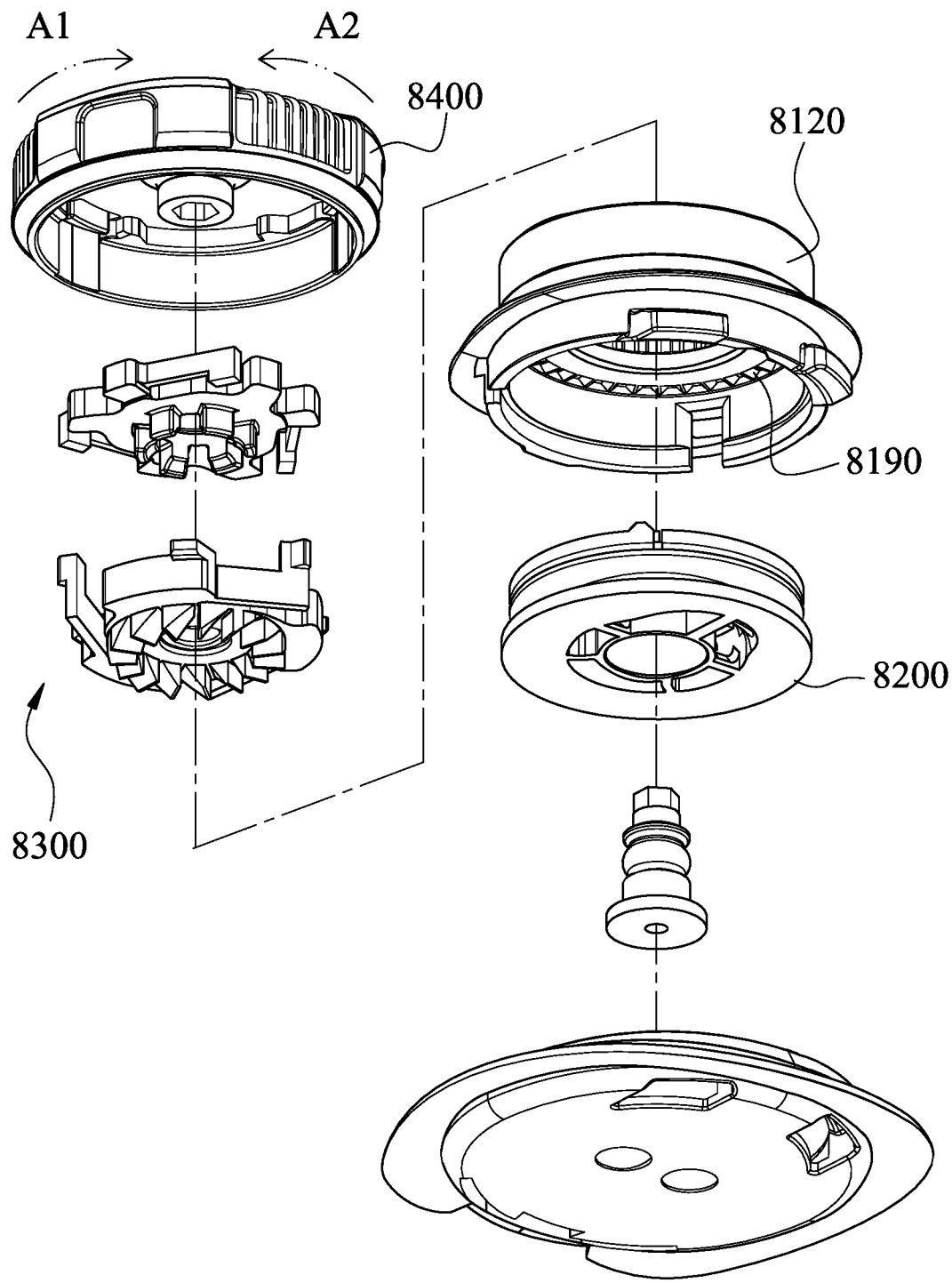
FIG. 44 is another exploded view of the fastening device of the eighth embodiment of FIG. 43.
Figure 45:
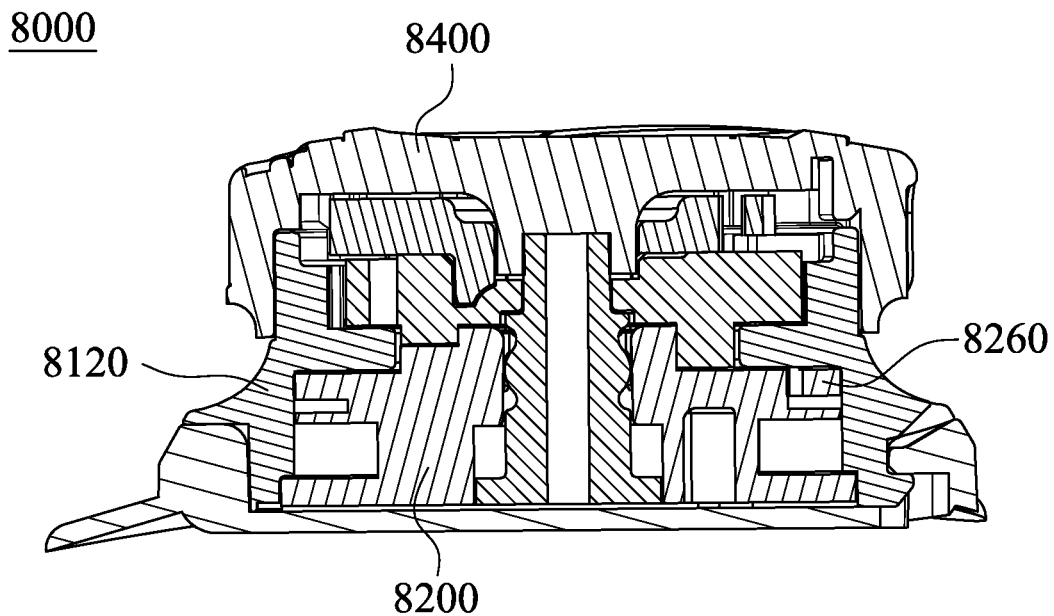
FIG. 45 is one cross-section side view of the fastening device of the eighth embodiment of FIG. 43.
Figure 46:
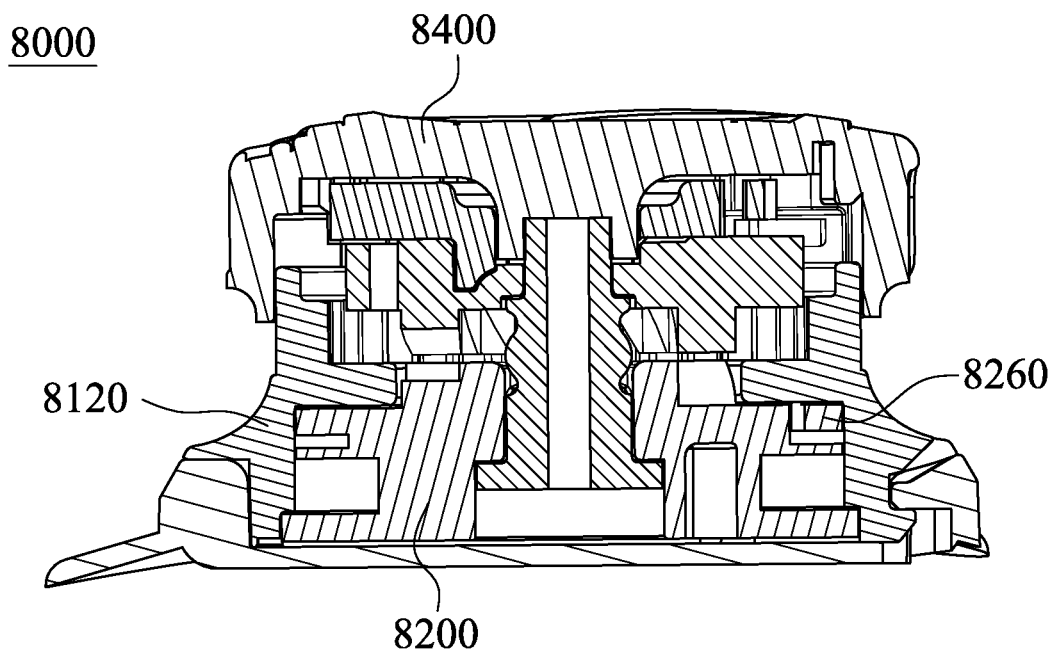
FIG. 46 is another cross-section side view of the fastening device of the eighth embodiment of FIG. 43.

FIG. 43 is one exploded view of a fastening device 8000 according to an eighth embodiment of the present disclosure. FIG. 44 is another exploded view of the fastening device 8000 of the eighth embodiment of FIG. 43. FIG. 45 is one cross-section side view of the fastening device 8000 of the eighth embodiment of FIG. 43. FIG. 46 is another cross-section side view of the fastening device 8000 of the eighth embodiment of FIG. 43. The fastening device 8000 of the eighth embodiment is similar to the fastening device 7000 of the seventh embodiment and includes a case (not labeled in the eighth embodiment), a spool 8200, a knob 8400 and an engaging unit 8300. The case includes a housing 8120, a plurality of engaging teeth 8140 and a plurality of depressions 8190. The difference is that the depressions 8190 are located below the partition, and abutting members 8260 protrude upward from the upper ring portion of the spool 8200. Other similar structures and motions will not be repeated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A fastening device, comprising:
a case comprising a plurality of engaging teeth;
a spool disposed at the case and configured for a lace to be wound therearound;
a knob covering the case; and
an engaging unit disposed at the case and coupled to the spool, the engaging unit comprising:
at least one pawl arm selectively coupled to at least one of the engaging teeth; and
at least one abutting member;
wherein as the knob is rotated in a tensioning direction, the engaging unit is rotated and the at least one pawl arm is disengaged from at least one of the engaging teeth to allow the spool to tension the lace, and as the knob is rotated in a releasing direction to allow the at least one pawl arm to disengage from at least one of the engaging teeth, the at least one abutting member is deflected by a tension of the lace to offset a friction temporarily, thereby allowing the lace to be incrementally released.

2. The fastening device of claim 1, wherein the engaging unit further comprises an upper disc, a lower disc and at least one driving arm, the upper disc and the lower disc are rotatably connected, the at least one pawl arm and the at least one abutting member are located at the lower disc, and the at least one driving arm is located at the upper disc and coupled to the knob.

3. The fastening device of claim 2, wherein the knob comprises at least two knob teeth, one of the at least two knob teeth corresponds to the at least one driving arm, another one of the at least two knob teeth corresponds to the at least one pawl arm, as the knob is rotated in the tensioning direction, the one of the at least two knob teeth pushes the at least one driving arm to drive the engaging unit to rotate the spool in the tensioning direction, and as the knob is rotated in the releasing direction, the another one of the at least two knob teeth pushes and allows the at least one pawl arm to disengage from at least one of the engaging teeth.

4. The fastening device of claim 3, wherein the at least one pawl arm comprises:
an engaging portion; and
a lower projection extending from the engaging portion integrally and outward, the lower projection corresponding to at least one of the engaging teeth.

5. The fastening device of claim 3, wherein a number of the at least two knob teeth is plural, the knob teeth are circularly arranged around an inner side wall of the knob, each of the knob teeth comprises a first inclined surface and a second inclined surface, a slope of each of the first inclined surfaces is different from a slope of each of the second inclined surfaces, and an interval is contain between two of the knob teeth that are adjacent thereto.

6. The fastening device of claim 1, wherein the at least one abutting member has a pawl structure and is correspondingly engaged with at least one of the engaging teeth.

7. The fastening device of claim 1, wherein the case further comprises a housing and a partition, the partition extends inward from the housing and an upper chamber and a lower chamber are formed, and the engaging unit is received in the upper chamber.

8. The fastening device of claim 7, wherein the at least one abutting member is located below the at least one pawl arm and has a strip structure, and the case comprises a plurality of stopping curved ribs protruding upward from the partition and corresponding to the at least one abutting member.

9. The fastening device of claim 7, wherein the at least one abutting member has a toothed structure and is located at an inner side of the at least one pawl arm, the case further comprises a gear ring and a plurality of stopping teeth, the gear ring extends upward from the partition, the stopping teeth are located at the gear ring and face toward the engaging teeth, and as the knob is rotated in the releasing direction and the at least one pawl arm is deflected to disengage from at least one of the engaging teeth, the at least one abutting member is engaged with at least one of the stopping teeth.

10. The fastening device of claim 7, wherein the case further comprises a plurality of depressions, the depressions are located at the partition, and the at least one abutting member corresponds to at least one of the depressions.

11. A fastening device, comprising:
a case comprising a plurality of engaging teeth;
a spool disposed at the case and configured for a lace to be wound therearound;
a knob covering the case and comprising a plurality of knob teeth; and
an engaging unit disposed at the case and coupled to the spool, the engaging unit comprising:
at least one pawl arm selectively coupled to at least one of the engaging teeth; and
wherein as the knob is rotated in a tensioning direction, the engaging unit is rotated to drive the spool to tension the lace, and as the knob is rotated in a releasing direction, the at least one pawl arm is incrementally and radially deflected, a tension of the lace causes the at least one pawl arm to be fully disengaged from at least one of the engaging teeth to offset a friction temporarily, thereby allowing the lace to be incrementally released.

12. The fastening device of claim 11, wherein the engaging unit further comprises an upper disc, a lower disc and at least one driving arm, the lower disc is located below the upper disc, the at least one pawl arm is located at the lower disc, the at least one driving arm is located at the upper disc, and the at least one driving arm is coupled to at least one of the knob teeth.

13. The fastening device of claim 12, wherein the engaging unit further comprises a pressing block, at least one rotating arm and at least one pushing block, the at least one rotating arm is located at the upper disc and corresponds to at least one of the knob teeth, the at least one pushing block is located at the upper disc, the at least one pressing block is located at the lower disc and corresponds to the at least one rotating arm, as the knob is rotated in the releasing direction, the at least one rotating arm is pressed by the at least one pressing block, the upper disc is allowed to rotate relative to the lower disc, and the at least one pushing block pushes and deflects the at least one pawl arm incrementally and radially.

* * * * *